(12) United States Patent
Seo et al.

(10) Patent No.: US 8,885,742 B2
(45) Date of Patent: Nov. 11, 2014

(54) APPARATUS AND METHOD FOR TRANSMITTING AND RECEIVING REFERENCE SIGNAL (RS) FOR DEMODULATION

(75) Inventors: Han Byul Seo, Anyang-si (KR); Eun Sun Kim, Anyang-si (KR); Byoung Hoon Kim, Anyang-si (KR); Hak Seong Kim, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 254 days.

(21) Appl. No.: 13/502,102

(22) PCT Filed: Oct. 15, 2010

(86) PCT No.: PCT/KR2010/007084
§ 371 (c)(1),
(2), (4) Date: Apr. 13, 2012

(87) PCT Pub. No.: WO2011/046387
PCT Pub. Date: Apr. 21, 2011

(65) Prior Publication Data
US 2012/0201318 A1    Aug. 9, 2012

Related U.S. Application Data

(60) Provisional application No. 61/252,113, filed on Oct. 15, 2009, provisional application No. 61/252,177, filed on Oct. 16, 2009, provisional application No. 61/299,323, filed on Jan. 28, 2010.

(30) Foreign Application Priority Data

Feb. 12, 2010    (KR) .................. 10-2010-0013593

(51) Int. Cl.
*H04L 27/28*    (2006.01)
*H04L 5/00*    (2006.01)
*H04L 27/26*    (2006.01)
*H04B 7/155*    (2006.01)

(52) U.S. Cl.
CPC .............. *H04L 5/0048* (2013.01); *H04B 7/155* (2013.01); *H04L 5/0023* (2013.01); *H04L 27/2607* (2013.01)
USPC ........... 375/260; 375/259; 375/295; 375/316; 375/219; 370/315; 370/345; 370/211; 370/328; 455/7; 455/25; 455/8; 455/10

(58) Field of Classification Search
USPC .......... 375/260, 259, 295, 316, 219; 370/315, 370/345, 211, 328; 455/7, 25, 8, 10
See application file for complete search history.

(56) References Cited

U.S. PATENT DOCUMENTS

| | | | |
|---|---|---|---|
| 2008/0316947 | A1 | 12/2008 | Lindoff et al. |
| 2010/0061360 | A1 | 3/2010 | Chen et al. |
| 2011/0207399 | A1* | 8/2011 | Thiagarajan et al. ........... 455/21 |
| 2011/0306291 | A1* | 12/2011 | Ma et al. ........................ 455/9 |

OTHER PUBLICATIONS

Robert Love et al., "Downlink Control Channel Design for 3GPP LTE", IEEE Wireless Communications and Networking Conference, Apr. 2008.

* cited by examiner

*Primary Examiner* — Zewdu Kassa
(74) *Attorney, Agent, or Firm* — Lee, Hong, Degerman, Kang & Waimey

(57) ABSTRACT

An apparatus and method for transmitting and receiving a demodulation reference signal (DM RS) are disclosed. A method for controlling a base station (BS) to transmit a demodulation reference signal (Demodulation RS or DM RS) in a wireless communication system includes transmitting, by the base station (BS), a DM RS for a relay node (RN) to the relay node (RN) through a specific backhaul subframe to which an extended cyclic prefix (CP) is applied. The DM RS is transmitted over two resource elements (REs) of individual subcarriers having subcarrier frequency indexes 2, 5, 8 and 11 in a frequency axis within a second slot of the specific backhaul subframe.

20 Claims, 18 Drawing Sheets

(a)

(b)

(a)

(b)

007084, filed on Oct. 15, 2010, which claims the benefit of earlier filing date and right of priority to Korean Application No. 10-2010-0013593, filed on Feb. 12, 2010, and also claims the benefit of U.S. Provisional Application Ser. Nos. 61/299,323, filed on Jan. 28, 2010, 61/252,177, filed on Oct. 16, 2009, and 61/252,113, filed on Oct. 15, 2009, the contents of which are all incorporated by reference herein in their entirety.

APPARATUS AND METHOD FOR TRANSMITTING AND RECEIVING REFERENCE SIGNAL (RS) FOR DEMODULATION

CROSS-REFERENCE TO RELATED APPLICATIONS

This application is the National Stage filing under 35 U.S.C. 371 of International Application No. PCT/KR2010/

TECHNICAL FIELD

The present invention relates to wireless communication, and more particularly to an apparatus and method for transmitting and receiving a reference signal (RS) for demodulation.

BACKGROUND ART

In a wireless communication system, a transmitter side transmits data over a radio frequency (RF) channel, such that signal distortion may occur during data transmission. In order to allow a receiver side to normally decode the distorted signal, the receiver side has to recognize channel information and needs to correct the signal distortion on the basis of the recognized channel information. In order to allow the receiver side to recognize information of the transmission (Tx) channel, a signal known to both the receiver and the transmitter side needs to be transmitted, the receiver side recognizes the degree of distortion of the transmission (Tx) signal when receiving the signal over the transmission (Tx) channel, such that it can recognize channel information on the basis of the recognized degree of distortion. In this case, the transmission (Tx) signal known to both the receiver and the transmitter side is hereinafter referred to as a pilot signal or a reference signal.

Recently, in most mobile communication systems, when data or packets are transmitted, a method for improving data transmission/reception efficiency using a multiple input multiple output (MIMO) communication system including multiple transmission antennas and multiple reception antennas has been used. The MIMO communication system assigns an independent channel to each transmission (Tx) antenna in such a manner that it transmits an independent reference signal to each transmission (Tx) antenna, such that the MIMO communication system can recognize a channel condition between transmission (Tx) and reception (Rx) antennas.

In a general communication system, reference signals (RSs) may be largely divided into two RSs according to functions thereof: a common RS for acquiring channel information and an RS used for data demodulation. The former is used for enabling a User Equipment (UE) to acquire downlink channel information. Therefore, the common RS should be transmitted in a wideband, and even a UE which does not receive downlink data in a specific subframe can receive and measure this RS. In addition, the common RS is also used for measurement for handover or the like.

The latter is an RS which is sent together with resources when a base station (eNB) sends downlink data. The UE may receive this RS so as to perform channel estimation and data demodulation. Therefore, this RS for data demodulation is transmitted in a region in which data is transmitted.

Meanwhile, in recent times, communication systems have a tendency to gradually increase a service frequency band as well as to gradually reduce a radius of each cell, such that the recent communication systems can implement high-speed communication and accommodate much more traffic. As a result, the conventional centralized cellular wireless network system has problems in that it cannot adapt to future changes. That is, the position of a base station (BS) is fixed, which deteriorates the flexibility of wireless link construction. As a result, the aforementioned centralized cellular wireless network system has difficulty in providing an efficient communication service in a wireless environment in which traffic distribution or the amount of requested traffic is dramatically changed.

In order to solve the aforementioned problems, a multi-hop relay system has been proposed. The multi-hop relay system enlarges a cell service region by partially covering a dead zone generated in a cell region, increases system capacity, and applies a relay to an initial situation having a small number of service requests, resulting in reduction in initial installation costs.

FIG. 1 is a conceptual diagram illustrating a relay backhaul link and a relay access link for use in a wireless communication system.

Referring to FIG. 1, a relay node (RN) for use in a long term evolution-advanced (LTE-A) system performs forwarding of a link between a base station (BS) and a UE, and two links having different attributes are applied to an uplink carrier frequency band and a downlink carrier frequency band. A link between a BS and an RN is defined as a backhaul link. The backhaul link scheme may be classified into a backhaul downlink scheme and a backhaul uplink scheme. The backhaul downlink scheme transmits data using downlink resources according to a frequency division duplex (FDD) or time division duplex (TDD) scheme. The backhaul uplink scheme transmits data using uplink resources according to the FDD or TDD scheme.

The relay node (RN) may receive information from the BS through relay backhaul downlink, or may transmit information to the BS through relay backhaul uplink. In addition, the relay node (RN) may transmit information to a UE through relay access downlink, or may receive information from the UE through relay access uplink.

The LTE-A system is being improved to increase communication performance of a UE by installing an RN therein. However, the LTE-A system has not yet disclosed a method for performing RS transmission/reception between a BS and an RN.

DISCLOSURE OF INVENTION

Technical Problem

Accordingly, the present invention is directed to an apparatus and method for transmitting and receiving a demodulation reference signal (RS) that substantially obviate one or more problems due to limitations and disadvantages of the related art.

An object of the present invention devised to solve the problem lies on a method for transmitting a demodulation RS.

Another object of the present invention devised to solve the problem lies on a method for receiving a demodulation RS.

Another object of the present invention devised to solve the problem lies on a base station for transmitting a demodulation RS.

Another object of the present invention devised to solve the problem lies on a relay node (RN) for receiving a demodulation RS.

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

Solution to Problem

The object of the present invention can be achieved by providing a method for transmitting a demodulation reference signal (Demodulation RS or DM RS) at a base station (BS) in a wireless communication system, the method including transmitting the DM RS for a relay node (RN) to the RN through a specific backhaul subframe to which an extended cyclic prefix (CP) is applied, wherein the DM RS is transmitted over two resource elements (REs) of each subcarrier having subcarrier frequency indexes 2, 5, 8 and 11 in a frequency axis within a second slot of the specific backhaul subframe.

The DM RS may be transmitted through Orthogonal Frequency Division Multiplexing (OFDM) symbols having OFDM symbol indexes 7 and 8 or OFDM symbols having OFDM symbol indexes 8 and 10 in the time axis.

In another aspect of the present invention, provided herein is a method for transmitting a demodulation reference signal (Demodulation RS or DM RS) at a base station (BS) in a wireless communication system, the method including transmitting the DM RS for a relay node (RN) to the RN through a specific backhaul subframe to which an extended cyclic prefix (CP) is applied, wherein the DM RS is transmitted through one Orthogonal Frequency Division Multiplexing (OFDM) symbol in a time axis and 8 subcarriers in a frequency axis within the second slot of the specific backhaul subframe.

An index of the one OFDM symbol through which the DM RS is transmitted may be set to 10.

The 8 subcarriers for DM RS transmission in the frequency axis may have subcarrier indexes of 0, 1, 3, 4, 6, 7, 9 and 10 or other subcarrier indexes of 1, 2, 4, 5, 7, 8, 10 and 11.

In another aspect of the present invention, provided herein is a method for receiving a demodulation reference signal (Demodulation RS or DM RS) at a relay node (RN) in a wireless communication system, the method including receiving the DM RS for the RN from the base station (BS) through a specific backhaul subframe to which an extended cyclic prefix (CP) is applied, wherein the DM RS is received over two resource elements (REs) of each subcarrier having subcarrier frequency indexes 2, 5, 8 and 11 in a frequency axis within a second slot of the specific backhaul subframe.

The DM RS may be received through Orthogonal Frequency Division Multiplexing (OFDM) symbols having OFDM symbol indexes 7 and 8 in a time axis, or may be received through OFDM symbols having OFDM symbol indexes 8 and 10 in the time axis.

In another aspect of the present invention, provided herein is a method for controlling a relay node (RN) to receive a demodulation reference signal (demodulation RS or DM RS) from a base station (BS) in a wireless communication system, the method including receiving a DM RS for a relay node (RN) from the base station (BS) through a specific backhaul subframe to which an extended cyclic prefix (CP) is applied, wherein the DM RS is received through a single Orthogonal Frequency Division Multiplexing (OFDM) symbol in a time axis within a second slot of the specific backhaul subframe, and is received through 8 subcarriers in a frequency axis within the second slot of the specific backhaul subframe.

An index of the single OFDM symbol through which the DM RS is transmitted may be set to 10.

The 8 subcarriers in the frequency axis may have subcarrier indexes of 0, 1, 3, 4, 6, 7, 9 and 10 or other subcarrier indexes of 1, 2, 4, 5, 7, 8, 10 and 11.

In another aspect of the present invention, provided herein is a base station (BS) for transmitting a demodulation reference signal (Demodulation RS or DM RS) in a wireless communication system, the base station (BS) including a transmitter for transmitting a DM RS for a relay node (RN) to the RN through a specific backhaul subframe to which an extended cyclic prefix (CP) is applied, and a processor for controlling the DM RS to be transmitted over two resource elements (REs) of each subcarrier having subcarrier frequency indexes 2, 5, 8 and 11 in a frequency axis within a second slot of the specific backhaul subframe.

The processor may control the DM RS to be transmitted through Orthogonal Frequency Division Multiplexing (OFDM) symbols having OFDM symbol indexes 7 and 8 in a time axis or to be transmitted through OFDM symbols having OFDM symbol indexes 8 and 10 in the time axis.

In another aspect of the present invention, provided herein is a base station (BS) apparatus for transmitting a demodulation reference signal (demodulation RS or DM RS) in a wireless communication system, the base station (BS) apparatus including a transmitter for transmitting a DM RS for a relay node (RN) to the RN through a specific backhaul subframe to which an extended cyclic prefix (CP) is applied, and a processor for controlling the DM RS to be transmitted through one Orthogonal Frequency Division Multiplexing (OFDM) symbol in a time axis within a second slot of the specific backhaul subframe, and to be transmitted through 8 subcarriers in a frequency axis within the second slot of the specific backhaul subframe.

In another aspect of the present invention, provided herein is a relay node (RN) apparatus for receiving a demodulation reference signal (Demodulation RS or DM RS) from a base station (BS) in a wireless communication system, the relay node (RN) apparatus including a receiver for receiving a DM RS for the relay node (RN) from the base station (BS) through a specific backhaul subframe to which an extended cyclic prefix (CP) is applied, wherein the DM RS is received over two resource elements (REs) of each subcarrier having subcarrier frequency indexes 2, 5, 8 and 11 in a frequency axis within a second slot of the specific backhaul subframe.

In another aspect of the present invention, provided herein is a relay node (RN) apparatus for receiving a demodulation reference signal (demodulation RS or DM RS) from a base station (BS) in a wireless communication system, the relay node (RN) apparatus including a receiver for receiving a DM RS for a relay node (RN) from the base station (BS) through a specific backhaul subframe to which an extended cyclic prefix (CP) is applied, wherein the DM RS is received through one Orthogonal Frequency Division Multiplexing (OFDM) symbol in a time axis within a second slot of the specific backhaul subframe, and is received through 8 subcarriers in a frequency axis within the second slot of the specific backhaul subframe.

Advantageous Effects of Invention

The exemplary embodiments of the present invention have the following effects.

When a demodulation RS (DM RS) is transmitted and received on the basis of a DM RS pattern according to the embodiments of the present invention, channel estimation performance and data demodulation performance between a BS and an RN are greatly improved, resulting in effective wireless communication.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
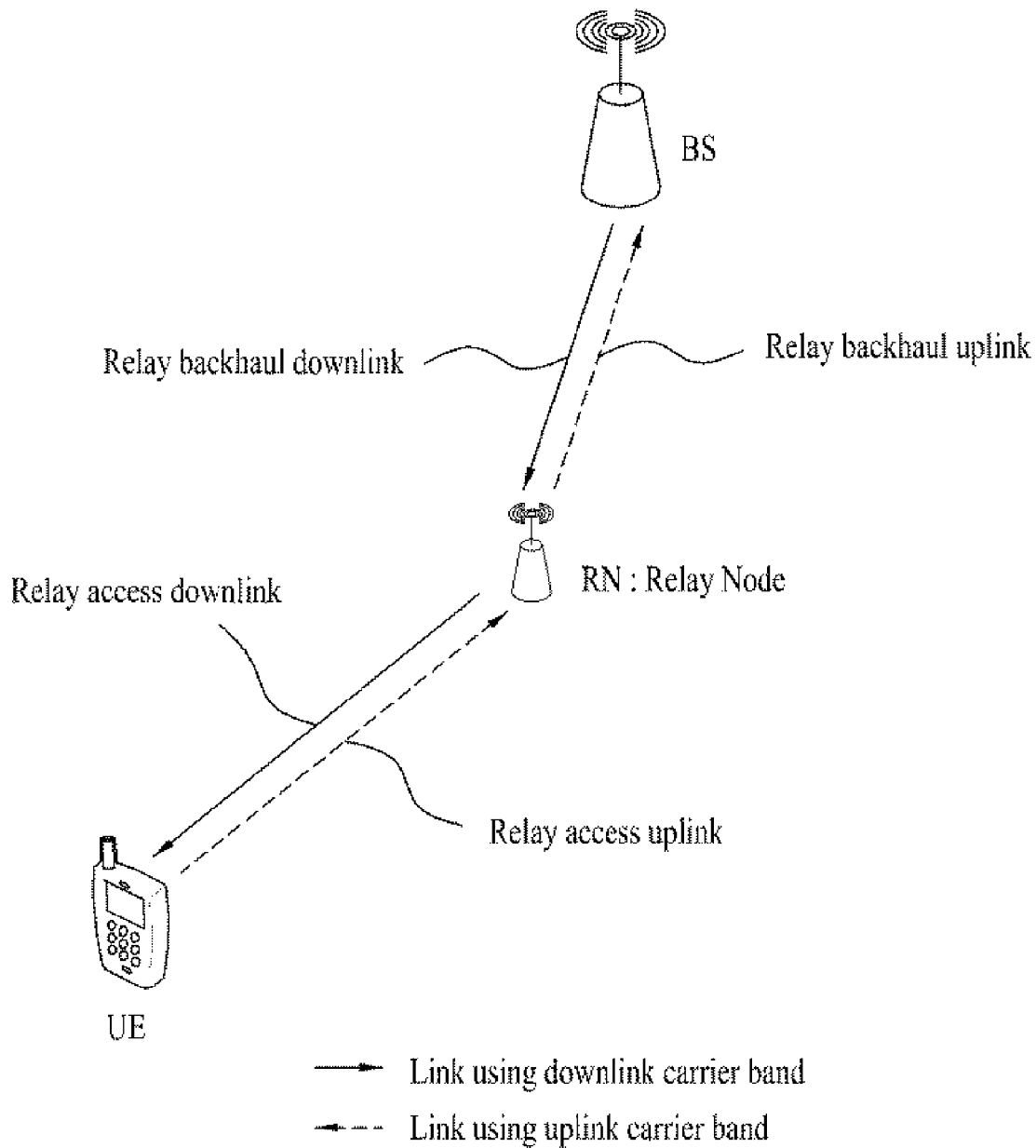
FIG. 1 is a conceptual diagram illustrating a relay backhaul link and a relay access link for use in a wireless communication system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system or an LTE-A system, but the present invention is not limited thereto and the remaining parts of the present invention other than unique characteristics of the 3GPP LTE or LTE-A system are applicable to other mobile communication systems.

In some cases, in order to prevent ambiguity of the concepts of the present invention, conventional devices or apparatuses well known to those skilled in the art will be omitted and be denoted in the form of a block diagram so as to focus upon important functions of the present invention. Wherever possible, the same reference numbers will be used throughout the drawings to refer to the same or like parts.

In the following description, "terminal" may refer to a mobile or fixed user equipment (UE), for example, a user equipment (UE), a mobile station (MS), an advanced mobile station (AMS) and the like. Also, "base station" (BS) may refer to an arbitrary node of a network end which communicates with the above terminal, and may include a Node B (Node-B), an eNode B (eNode-B), an access point (AP) and the like. In addition, a relay node (RN) may also be referred to as a relay station (RS), a relay or the like.

In a mobile communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

A variety of multiple access methods can be applied to a wireless communication system according to the present invention, for example, a Code Division Multiple Access (CDMA) scheme, a Time Division Multiple Access (TDMA) scheme, a Frequency Division Multiple Access (FDMA) scheme, a Single Carrier-FDMA (SC-FDMA) scheme, an Orthogonal Frequency Division Multiple Access (OFDMA) scheme, etc. Needless to say, well-known modulation schemes may also be applied to the wireless communication system as necessary. In addition, a multiple access scheme for downlink (DL) transmission may be different from that of uplink (UL) transmission. For example, downlink may use the OFDMA scheme, and uplink may use the SC-FDMA scheme.

Although the present invention assumes that a relay node (RN) is a half-duplex RN incapable of simultaneously performing bidirectional transmission/reception through the same band, the relay node (RN) is not limited to the half-duplex scheme.

Figure 2:
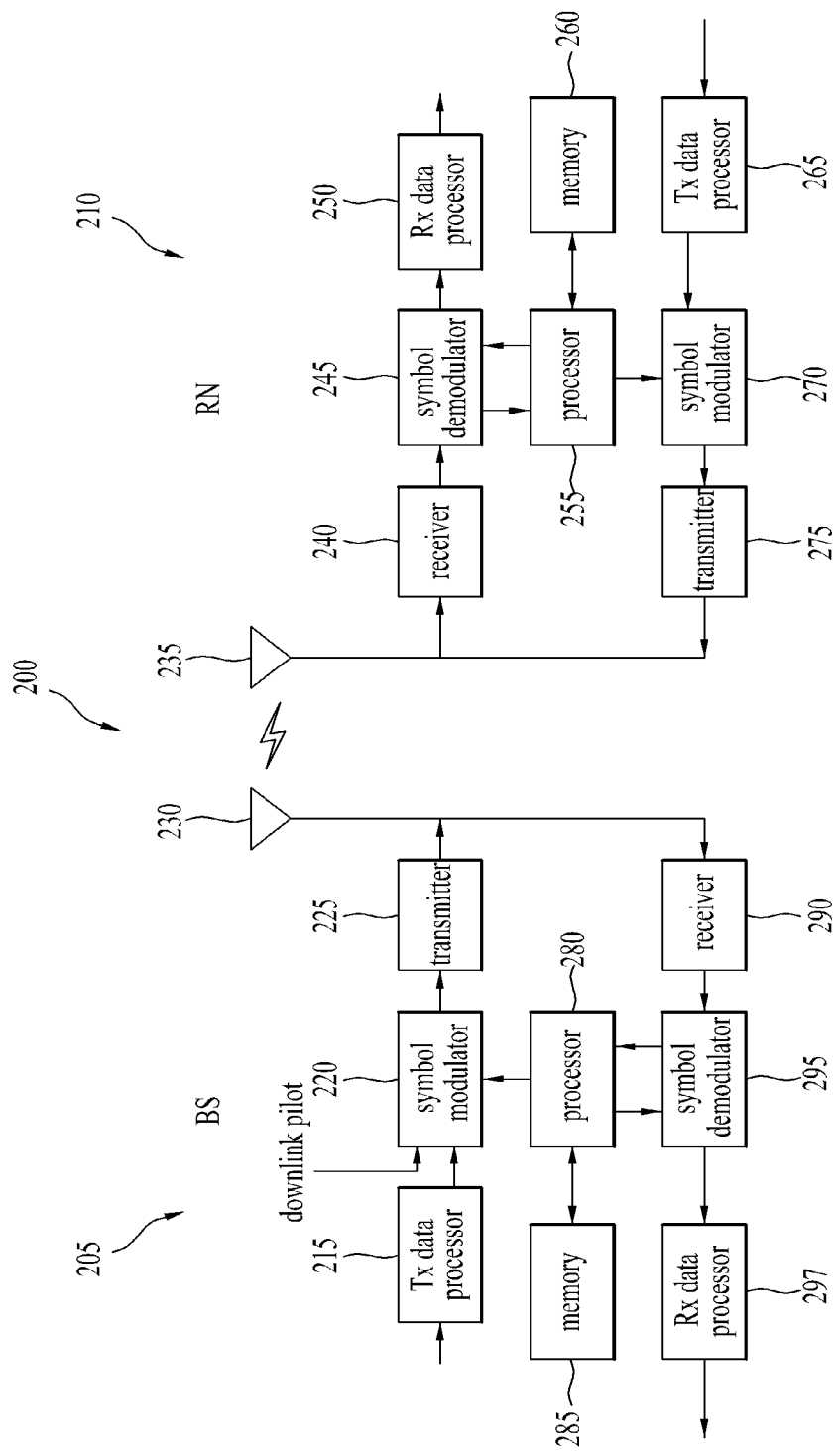
FIG. 2 is a block diagram illustrating a base station (BS) and a relay node (RN) for use in a wireless communication system according to the present invention.

FIG. 2 is a block diagram illustrating configuration of a base station (BS) 205 and a relay node (RN) 210 in a wireless communication system 200 according to the present invention.

Although FIG. 2 shows one BS 205 and one RN 210 for brief description of the wireless communication system 200, it should be noted that the wireless communication system 200 may further include one or more BSs and/or one or more RNs.

Referring to FIG. 2, the BS 205 may include a transmission (Tx) data processor 215, a symbol modulator 220, a transmitter 225, a transmission/reception antenna 230, a processor 280, a memory 285, a receiver 290, a symbol demodulator 295, and a reception (Rx) data processor 297. The relay node (RN) 210 may include a Tx data processor 265, a symbol modulator 270, a transmitter 275, a transmission/reception antenna 235, a processor 255, a memory 260, a receiver 240, a symbol demodulator 255, and a Rx data processor 250. In FIG. 2, although one antenna 230 is used for the BS 205 and one antenna 235 is used for the relay node (RN) 210, each of the BS 205 and the relay node (RN) 210 may also include a plurality of antennas as necessary. Therefore, the BS 205 and the relay node (RN) 210 according to the present invention support a Multiple Input Multiple Output (MIMO) system. The BS 205 according to the present invention can support both a Single User-MIMO (SU-MIMO) scheme and a Multi User-MIMO (MU-MIMO) scheme.

In downlink, the Tx data processor 215 receives traffic data, formats the received traffic data, codes the formatted traffic data, and interleaves the coded traffic data, and modulates the interleaved data (or performs symbol mapping upon the interleaved data), such that it provides modulation symbols (i.e., data symbols). The symbol modulator 220 receives and processes the data symbols and pilot symbols, such that it provides a stream of symbols.

The symbol modulator 220 multiplexes data and pilot symbols, and transmits the multiplexed data and pilot symbols to the transmitter 225. In this case, each transmission (Tx) symbol may be a data symbol, a pilot symbol, or a null signal. In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 225 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the relay node (RN) through the antenna 230.

Configuration of the relay node (RN) 210 will hereinafter be described in detail. The antenna 235 of the relay node (RN) 210 receives a DL signal from the BS 205, and transmits the DL signal to the receiver 240. The receiver 240 performs adjustment (e.g., filtering, amplification, and frequency downconversion) of the received DL signal, and digitizes the adjusted signal to obtain samples. The symbol demodulator 245 demodulates the received pilot symbols, and provides the demodulated result to the processor 255 to perform channel estimation.

The symbol demodulator 245 receives a frequency response estimation value for downlink from the processor 255, demodulates the received data symbols, obtains data symbol estimation values (indicating estimation values of the transmitted data symbols), and provides the data symbol estimation values to the Rx data processor 250. The Rx data processor 250 performs demodulation (i.e., symbol-demapping) of data symbol estimation values, deinterleaves the demodulated result, decodes the deinterleaved result, and recovers the transmitted traffic data.

The processing of the symbol demodulator 245 and the Rx data processor 250 is complementary to that of the symbol modulator 220 and the Tx data processor 215 in the BS 205.

The Tx data processor 265 of the relay node (RN) 210 processes traffic data in downlink, and provides data symbols. The symbol modulator 270 receives and multiplexes data symbols, and modulates the multiplexed data symbols, such that it can provide a stream of symbols to the transmitter 275. The transmitter 275 receives and processes the stream of symbols to generate an uplink (UL) signal, and the UL signal is transmitted to the BS 205 through the antenna 235.

The BS 205 receives the UL signal from the relay node (RN) 210 through the antenna 230. The receiver processes the received UL signal to obtain samples. Subsequently, the symbol demodulator 295 processes the symbols, and provides pilot symbols and data symbol estimation values received via uplink. The Rx data processor 297 processes the data symbol estimation value, and recovers traffic data received from the relay node (RN) 210.

Processor 255 or 280 of the relay node (RN) 210 or the BS 205 commands or indicates operations of the relay node (RN) 210 or the BS 205. For example, the processor 255 or 280 of the relay node (RN) 210 or the BS 204 controls, adjusts, and manages operations of the relay node (RN) 210 or the BS 205. Each processor 255 or 280 may be connected to a memory unit 260 or 285 for storing program code and data. The memory 260 or 285 is connected to the processor 255 or 280, such that it can store the operating system, applications, and general files.

The processor 255 or 280 may also be referred to as a controller, a microcontroller), a microprocessor, a microcomputer, etc.

In the meantime, the processor 255 or 280 may be implemented by various means, for example, hardware, firmware, software, or a combination thereof. In a hardware configuration, methods according to the embodiments of the present invention may be implemented by the processor 255 or 280, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 255 or 280 or the memory unit 260 or 285, such that it can be driven by the processor 255 or 280.

Radio interface protocol layers among the relay node (RN) 210, the BS 205, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1)

provides an information transfer service through a physical channel. A Radio Resource Control (RRC) layer belonging to the third layer (L3) controls radio resources between the UE and the network. The relay node (RN) 210 and the BS 205 may exchange RRC messages with each other through the wireless communication network and the RRC layer.

Figure 3:
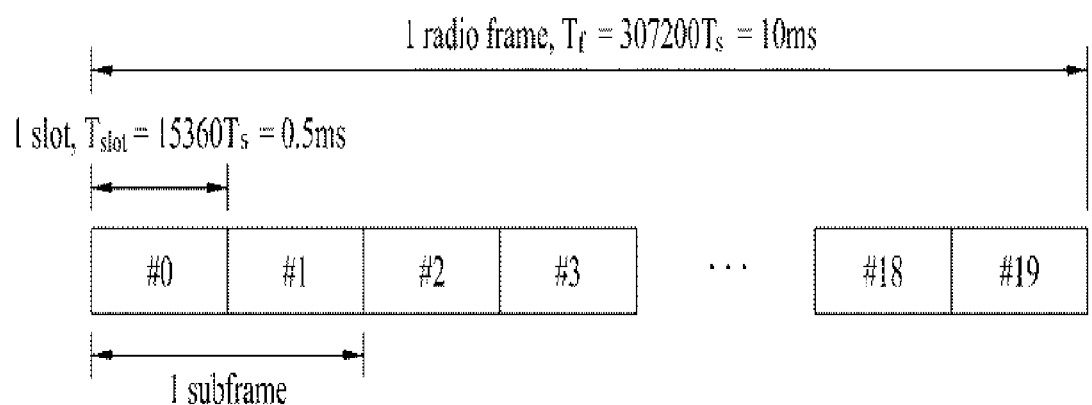
FIG. 3 is an exemplary structural diagram illustrating a radio frame for use in a 3GPP LTE system acting as an exemplary mobile communication system according to the present invention.

FIG. 3 is a diagram illustrating a structure of a radio frame used in a 3GPP LTE system acting as a mobile communication system.

Referring to FIG. 3, the radio frame has a length of 10 ms (327200*Ts) and includes 10 subframes of equal size. Each subframe has a length of 1 ms and includes two slots. Each slot has a length of 0.5 ms (15360*Ts). In this case, Ts represents a sampling time, and is expressed by 'Ts=1/(15 kHz*2048)=3.2552*10−8 (about 33 ns)'. The slot includes a plurality of OFDM or SC-FDMA symbols in a time domain, and includes a plurality of resource blocks (RBs) in a frequency domain.

In the LTE system, one resource block includes twelve (12) subcarriers*seven (or six) OFDM (Orthogonal Frequency Division Multiplexing) symbols. A Transmission Time Interval (TTI) which is a transmission unit time of data can be determined in a unit of one or more subframes. The aforementioned structure of the radio frame is only exemplary and various modifications can be made to the number of subframes contained in the radio frame or the number of slots contained in each subframe, or the number of OFDM or SC-FDMA symbols in each slot.

Figure 4:
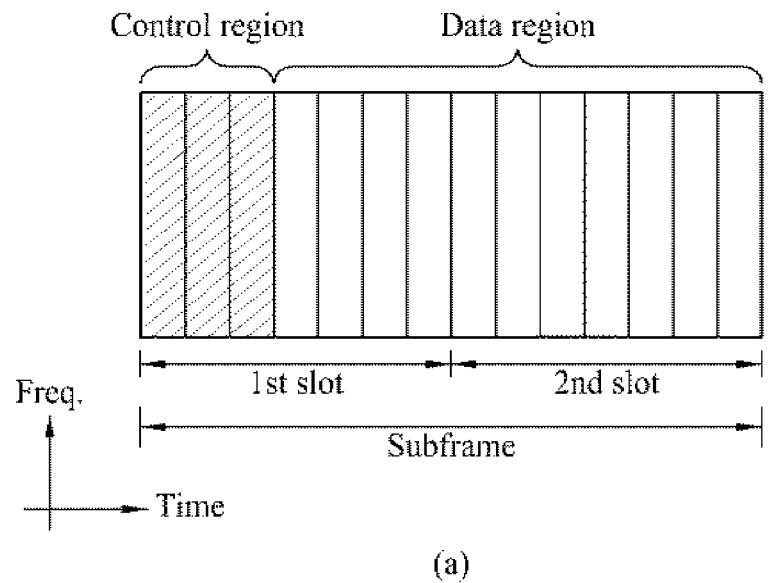
FIG. 4 is an exemplary structural diagram illustrating downlink and uplink subframes for use in a 3GPP LTE system acting as an exemplary mobile communication system according to the present invention.
Figure 4:
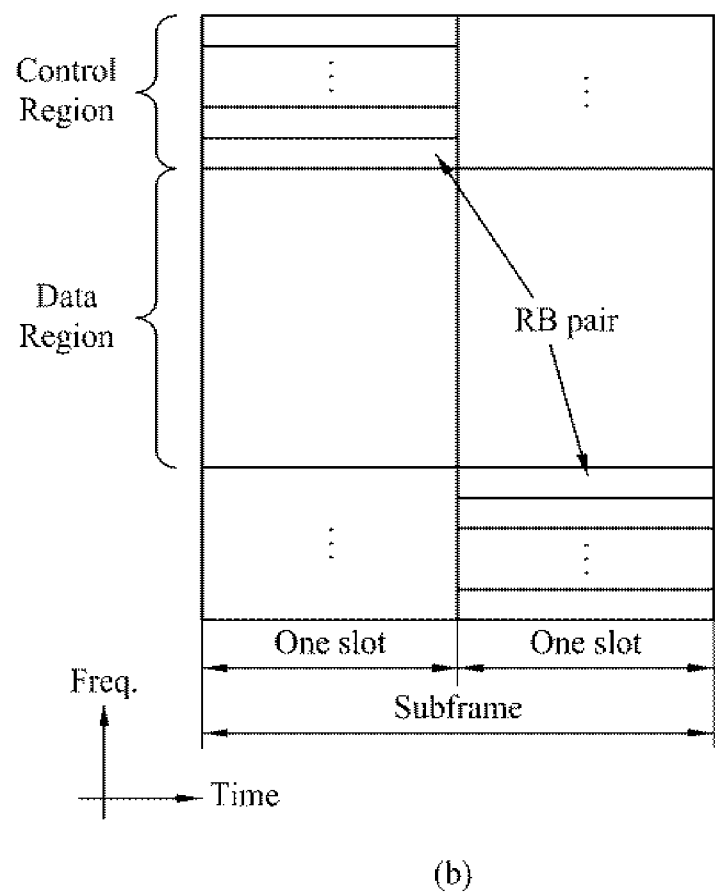

FIG. 4 is an exemplary structural diagram illustrating downlink and uplink subframes for use in a 3GPP LTE system acting as an exemplary mobile communication system according to the present invention.

Referring to FIG. 4, one downlink subframe includes two slots in a time domain. A maximum of three OFDM symbols located in the front of the downlink subframe are used as a control region to which control channels are allocated, and the remaining OFDM symbols are used as a data region to which a Physical Downlink Shared Channel (PDSCH) channel is allocated. DL control channels for use in the 3GPP LTE system includes a Physical Control Format Indicator CHannel (PCFICH), a Physical Downlink Control Channel (PDCCH), a Physical Hybrid-ARQ Indicator CHannel (PHICH), and the like. The traffic channel includes a Physical Downlink Shared CHannel (PDSCH). PCFICH transmitted through a first OFDM symbol of the subframe may carry information about the number of OFDM symbols (i.e., the size of control region) used for transmission of control channels within the subframe. Control information transmitted through PDCCH is referred to as downlink control information (DCI). The DCI may indicate UL resource allocation information, DL resource allocation information, UL transmission power control commands of arbitrary UE groups, etc. PHICH may carry ACK (Acknowledgement)/NACK (Not-Acknowledgement) signals about an UL Hybrid Automatic Repeat Request (UL HARQ). That is, the ACK/NACK signals about UL data transmitted from the UE are transmitted over PHICH.

PDCCH acting as a DL physical channel will hereinafter be described in detail.

A base station (BS) may transmit information about resource allocation and transmission format (UL grant) of the PDSCH, resource allocation information of the PUSCH, information about Voice over Internet Protocol (VoIP) activation, etc. A plurality of PDCCHs may be transmitted within the control region, and the UE may monitor the PDCCHs. Each PFCCH includes an aggregate of one or more contiguous control channel elements (CCEs). The PDCCH composed of the aggregate of one or more contiguous CCEs may be transmitted through the control region after performing subblock interleaving. CCE is a logical allocation unit for providing a coding rate based on a Radio frequency (RF) channel status to the PDCCH. CCE may correspond to a plurality of resource element groups. PDCCH format and the number of available PDCCHs may be determined according to the relationship between the number of CCEs and the coding rate provided by CCEs. Control information transmitted over PDCCH is referred to as downlink control information (DCI). The following Table 1 shows DCIs in response to DCI formats.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

In Table 1, DCI format 0 may indicate uplink resource allocation information. DCI format 1 and DCI format 2 may indicate downlink resource allocation information. DCI format 3 and DCI format 3A may indicate uplink transmit power control (TPC) commands for arbitrary UE groups.

A method for allowing a BS to perform resource mapping for PDCCH transmission in the 3GPP LTE system will hereinafter be described in detail.

Generally, the BS may transmit scheduling allocation information and other control information over the PDCCH. Information about a physical control channel (PCCH) is configured in the form of one aggregate (one aggregation) or several CCEs, such that the resultant information is transmitted as one aggregate or several CCEs. Namely, a PDCCH transmission unit of the BS is a CCE. One CCE includes 9 resource element groups (REGs). The number of RBGs unallocated to either Physical Control Format Indicator Channel (PCFICH) or Physical Hybrid Automatic Repeat Request Indicator Channel (PHICH) is NREG. CCEs from 0 to NCCE-1 may be available to a system $N_{CCE}=\lfloor N_{REG}/9 \rfloor$). PDCCH supports multiple formats as shown in the following Table 3. One PDCCH composed of n contiguous CCEs begins with a CCE having 'i mod n=0' (where 'i' is a CCE number). Multiple PDCCHs may be transmitted through one subframe.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, a base station (BS) may decide a PDCCH format according to how many regions are required for the BS to transmit control information. The UE reads control information and the like in units of a CCE, resulting in reduction of overhead. Likewise, the relay node (RN) may also read control information and the like in units of a Relay-CCE (R-CCE). In the LTE-A system, in order to allow the BS to transmit R-PDCCH information for an arbitrary RN, a resource element (RE) may be mapped in units of a Relay-Control Channel Element (R-CCE).

Referring to FIG. 4(b), an uplink (UL) subframe may be divided into a control region and a data region in a frequency domain. The control region may be assigned to a Physical Uplink Control Channel (PUCCH) carrying uplink control information (UCI). The data region may be assigned to a Physical Uplink Shared Channel (PUSCH) carrying user data. In order to maintain single carrier characteristics, one UE does not simultaneously transmit PUCCH and PUSCH. PUCCH for one UE may be assigned to a Resource Block (RB) pair in one subframe. RBs of the RB pair occupy different subcarriers in two slots. The RB pair assigned to PUCCH performs frequency hopping at a slot boundary.

Figure 5:
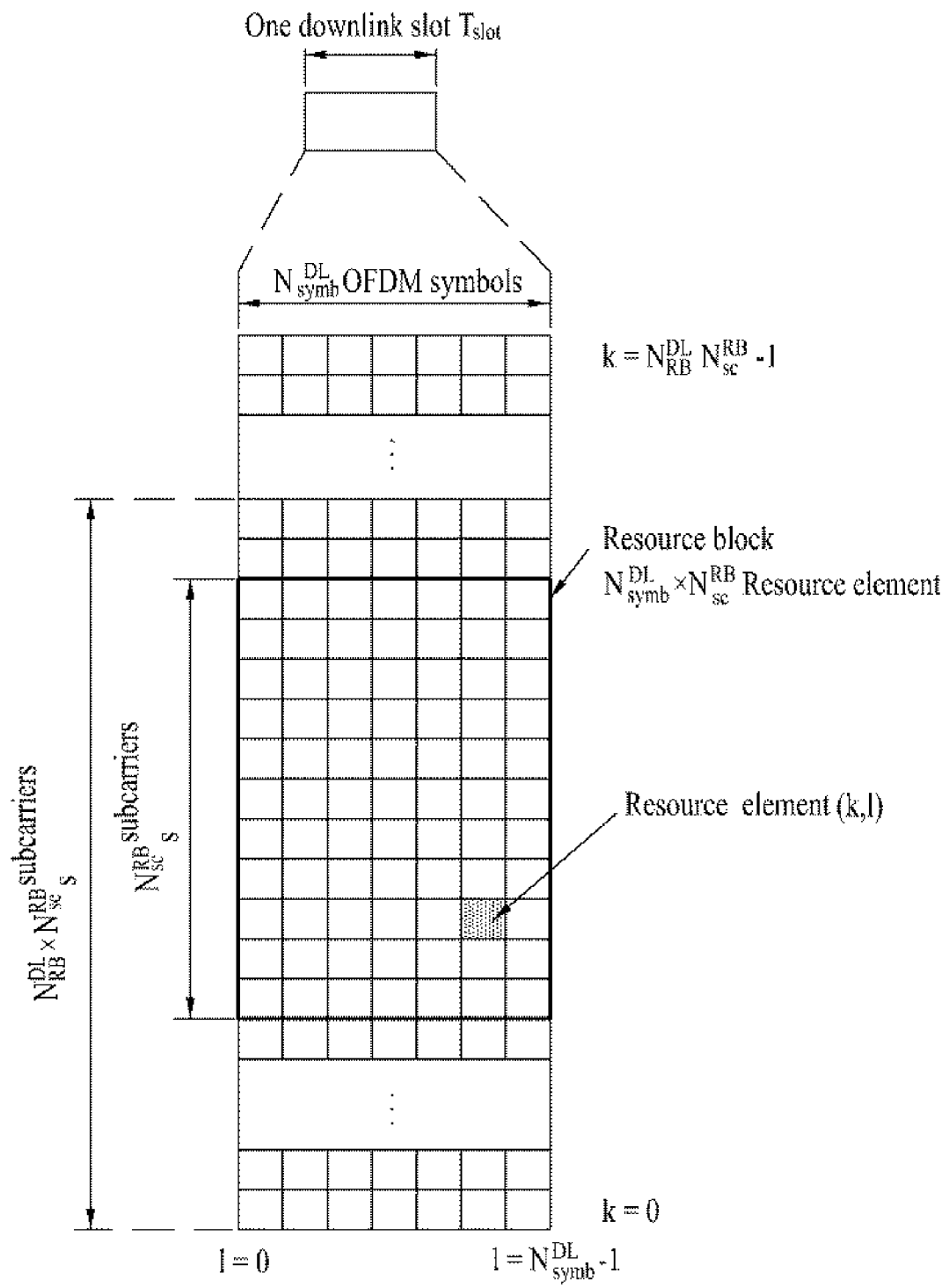
FIG. 5 shows a downlink (DL) time-frequency resource grid structure according to the present invention.

FIG. 5 shows a downlink time-frequency resource grid structure according to the present invention.

Referring to FIG. 5, downlink transmission resources can be described by a resource grid including $N_{RB}^{DL} \times N_{SC}^{RB}$ subcarriers and $N_{symb}^{DL}$ OFDM symbols. Here, $N_{RB}^{DL}$ represents the number of resource blocks (RBs) in a downlink, $N_{SC}^{RB}$ represents the number of subcarriers constituting one RB, and $N_{symb}^{DL}$ represents the number of OFDM symbols in one downlink slot. $N_{RB}^{DL}$ varies with a downlink transmission bandwidth constructed in a cell, and must satisfy $$N_{RB}^{min,DL} \le N_{RB}^{DL} \le N_{RB}^{max,DL}.$$

Here, $$N_{RB}^{min,DL}$$

is the largest downlink bandwidth supported by the wireless communication system. Although $$N_{RB}^{max,RB}$$

may be set to 6

$$(N_{RB}^{min,DL=6}) \text{ and } N_{RB}^{max,RB}$$

may be set to 110

$$(N_{RB}^{max,RB=110}),$$

the scopes of $$N_{RB}^{min,DL} \text{ and } N_{RB}^{max,RB}$$

are not limited thereto. The number of OFDM symbols contained in one slot may be differently defined according to the length of a Cyclic Prefix (CP) and spacing between subcarriers. When transmitting data or information via multiple antennas, one resource grid may be defined for each antenna port m.

Each element contained in the resource grid for each antenna port is called a resource element (RE), and can be identified by an index pair (k, l) contained in a slot, where k is an index in a frequency domain and is set to any one of $0, \ldots, N_{RB}^{DL}N_{SC}^{RB}-1$, and l is index in a time domain and is set to any one of $0, \ldots, N_{symb}^{DL}-1$.

Resource blocks (RBs) shown in FIG. 5 are used to describe a mapping relationship between certain physical channels and resource elements (REs). The RBs can be classified into physical resource blocks (PRBs) and virtual resource blocks (VRBs). One PRB is defined by $N_{symb}^{DL}$ consecutive OFDM symbols in a time domain and $N_{SC}^{RB}$ consecutive subcarriers in a frequency domain. $N_{symb}^{DL}$ and $N_{SC}^{RB}$ may be predetermined values, respectively. For example, $N_{symb}^{DL}$ and $N_{SC}^{RB}$ may be given as shown in the following Table 3. Therefore, one PRB may be composed of $N_{symb}^{DL} \times N_{SC}^{RB}$ resource elements. One PRB may correspond to one slot in a time domain and may also correspond to 180 kHz in a frequency domain, but it should be noted that the scope of the present invention is not limited thereto.

TABLE 3

| Configuration | | $N_{sc}^{RB}$ | $N_{symb}^{DL}$ |
|---|---|---|---|
| Normal cyclic prefix | Δf = 15 kH | 12 | 7 |
| Extended cyclic prefix | Δf = 15 kH | | 6 |
| | Δf = 7.5 kH | 24 | 3 |

The PRBs are assigned numbers from 0 to $N_{RB}^{DL}-1$ in the frequency domain. A PRB number and a resource element index (k,l) in a slot can satisfy a predetermined relationship denoted by $$n_{PRB} = \left\lfloor \frac{k}{N_{sc}^{RB}} \right\rfloor.$$

The VRB may have the same size as that of the PRB. The VRB may be classified into a localized VRB (LVRB) and a distributed VRB (DVRB). For each VRB type, a pair of PRBs allocated over two slots of one subframe is assigned a single VRB number $n_{VRB}$.

The VRB may have the same size as that of the PRB. Two types of VRBs are defined, the first one being a localized VRB (LVRB) and the second one being a distributed type (DVRB). For each VRB type, a pair of PRBs may have a single VRB index (which may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL}-1$, and $N_{RB}^{DL}$ VRBs belonging to a second one of the two slots are likewise each assigned any one index of 0 to $N_{RB}^{DL}-1$.

The radio frame structure, the downlink subframe, the uplink subframe, and the downlink time-frequency resource grid structure shown in FIGS. 3 to 5 may also be applied between a base station (BS) and a relay node (RN).

A downlink reference signal will hereinafter be described in detail.

The downlink reference signal includes a common reference signal (CRS) shared among all UEs contained in a cell and a dedicated reference signal (DRS) assigned to a specific UE. In the 3GPP LTE-A system or the like, the DRS may also be referred to as a demodulation RS (DM RS).

The common reference signal (CRS) may be used to acquire channel status information and perform handover measurement. The dedicated reference signal (DRS) may be used to demodulate data. The CRS may be a cell-specific reference signal, and the DRS may be a UE-specific reference signal.

The UE measures the CRS and informs the BS of channel feedback information (e.g., Channel Quality Information (CQI), Precoding Matrix Indicator (PMI), and Rank Indicator (RI)). The BS performs downlink frequency scheduling using feedback information received from the UE.

In order to transmit the aforementioned reference signals to the UE, the BS performs resource allocation in consideration of the amount of radio resources to be allocated to each reference signal, exclusive position of the CRS and the DRS, position of a synchronous channel (SCH) and a broadcast channel (BCH), the DRS density, and the like.

In this case, provided that a relatively large amount of resources is assigned to each reference signal, a data transmission rate is relatively deteriorated whereas channel estimation performance is increased. Provided that a relatively small amount of resources is assigned to each reference signal, a reference signal density is lowered whereas a data transmission rate is increased, resulting in deterioration of channel estimation performance. Effective resource allocation of each reference signal in consideration of channel estimation, data transmission rate, etc. is of importance to system performance.

Figure 6:
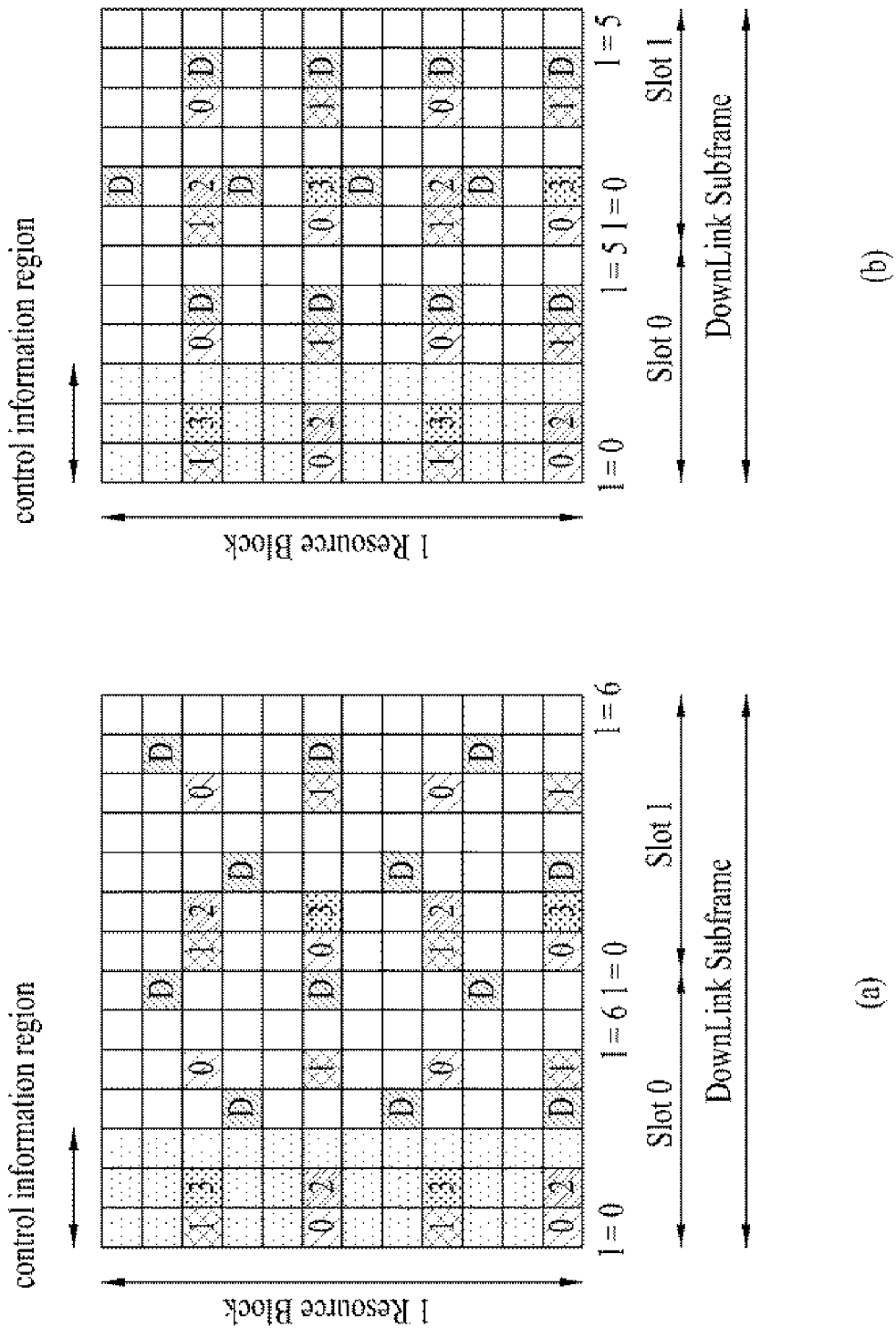
FIG. 6 is a conceptual diagram illustrating a reference signal (RS) structure for use in a downlink (DL) subframe according to one embodiment of the present invention, and shows a subframe structure mapped to a reference signal in a system capable of supporting a maximum of 4 antennas.

FIG. 6 is a conceptual diagram illustrating a reference signal (RS) structure for use in a downlink (DL) subframe according to one embodiment of the present invention, and shows a subframe structure mapped to a reference signal in a system capable of supporting a maximum of 4 antennas.

Referring to FIG. 6, one downlink subframe is composed of two time slots in a time domain, reference number '1' represents a symbol index of each slot, and the initial three symbols are assigned to a control information region. In addition, a reference signal (RS) is mapped in units of one resource block in a frequency domain, and the mapped resultant RS is repeatedly transmitted.

In FIG. 6, the number of OFDM symbols contained in one slot may be changed according to a cyclic prefix (CP) construction. FIG. 6(a) shows OFDM symbols for use with a normal CP. In FIG. 6(a), the number of OFDM symbols contained in one slot is 7. FIG. 6(b) shows OFDM symbols for use in the extended CP. In FIG. 6(b), the length of one OFDM symbol is increased, such that the number of OFDM symbols contained in one slot is less than that of a normal CP, for example, the number of OFDM symbols may be set to 6.

Reference elements (REs) 0, 1, 2 and 3 from among resource elements (REs) contained in the resource block (RB) shown in FIG. 6(a) or 6(b) represent cell-specific common reference signal (CRS) for four antenna ports. The REs 0, 1, 2 and 3 are adapted to measure a status of a channel ttransmitted through each antenna port 0, 1, 2 or 3 as well as to demodulate data transmitted to each port 0, 1, 2 or 3. Reference symbol 'D' represents a UE-specific dedicated reference signal (DRS), and is adapted to demodulate data transmitted over PDSCH. Information about the presence or absence of the DRS is transmitted to the UE via higher-layer signaling. This information corresponds to an effective resource element (RE) only in the case of a UE to which the corresponding PDSCH is allocated.

If the common reference signal (CRS) is mapped to time-frequency region resources, mapping of the CRS for one antenna port is performed at intervals of 6 REs in a frequency domain, and the CRS mapping result is transmitted at intervals of 6 REs. Therefore, one RB is composed of a total of 12 REs in a frequency domain, and two REs are used per antenna port.

Figure 7:
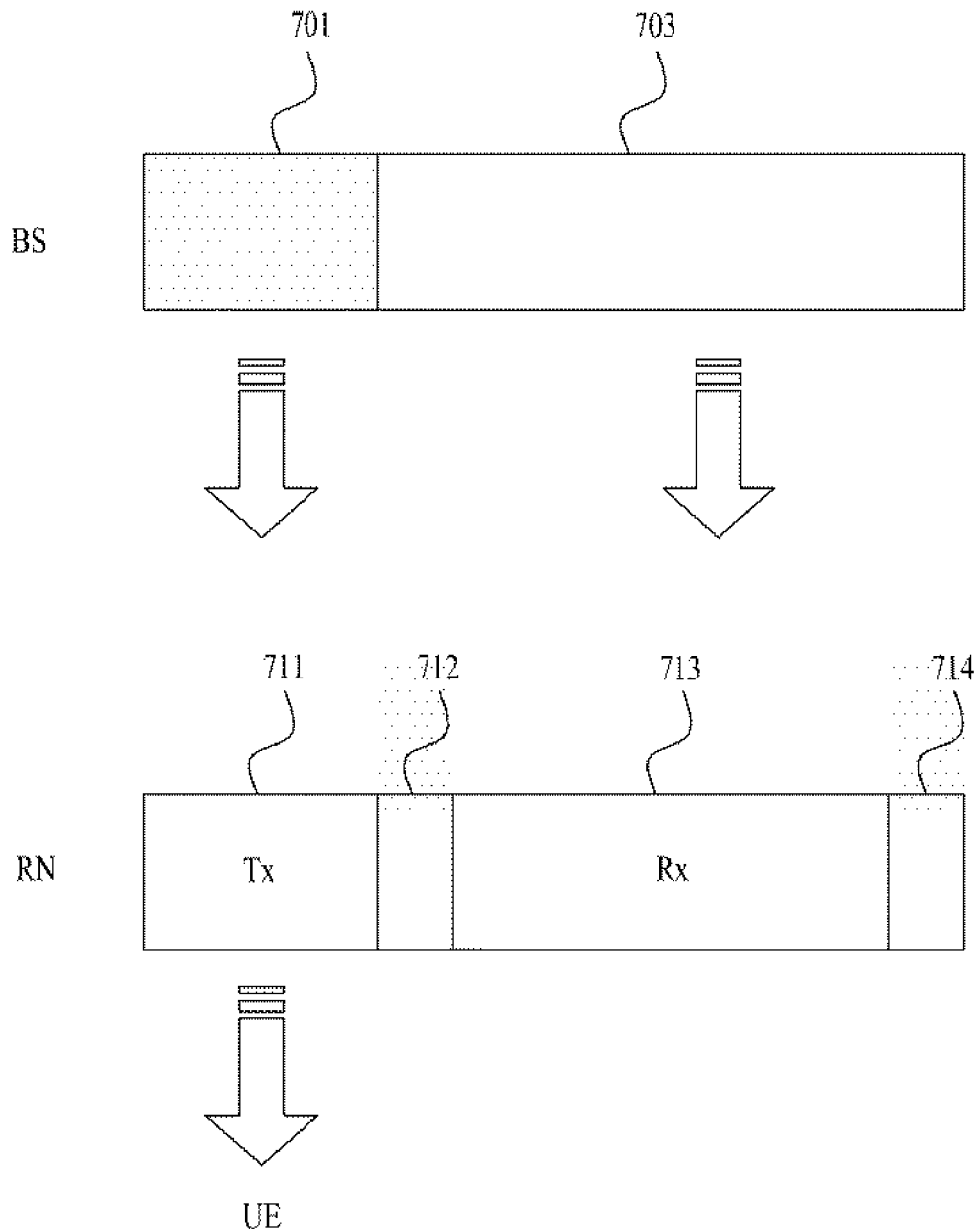
FIG. 7 shows subframe structures of a BS and an RN according to the present invention.

FIG. 7 shows subframe structures of a base station (BS) and a relay node (RN) according to the present invention.

In FIG. 7, the subframe includes a control channel 701 and a data channel 703. The control channel 701 may include PDCCH and the like, and the data channel 703 may include PDSCH and the like.

In a downlink backhaul subframe, the relay node (RN) must transmit PDCCH control information and a CRS to an access link for a UE during a specific symbol interval ranging from two initial OFDM symbols to a maximum of 4 OFDM symbols. In other words, the relay node (RN) is operated in a transmission (Tx) mode in the backhaul link subframe during the symbol interval corresponding to a maximum of 4 OFDM symbols, and has a transition gap 712 for transition from a transmission (Tx) mode to a reception (Rx) mode. The BS can transmit a signal such as R-PDCCH or R-PDSCH to the relay node (RN) after a PDSCH interval of the BS expires. Accordingly, provided that the relay node (RN) is ready to receive a signal of the BS in consideration of not only a PDCCH transmission symbol interval of the BS but also the aforementioned transition gap 712, the relay node (RN) receives an RN control channel such as R-PDCCH and an RN data channel such as R-PDSCH from the BS during the Rx mode interval 713 of the relay node (RN).

Thereafter, if the relay node (RN) has completely received the control channel and the data channel from the BS, it performs transition from the Rx mode to the Tx mode so as to transmit information of the control channel to the UE access link. In this case, a guard time (also called a guard interval) acting as a transition gap 714 for mode transition is configured.

Therefore, the relay node (RN) is unable to receive or transmit data in a symbol corresponding to each transition gap 712 or 714. Therefore, a signal to be received by the relay node (RN) needs to be transmitted from a symbol completing the transition operation of the relay node (RN), instead of a symbol initiating RN transition. As such, the number of symbols of a subframe capable of being actually used as a backhaul by the relay node (RN) in a backhaul link subframe (also known as a backhaul subframe) may be limited.

Figure 8:
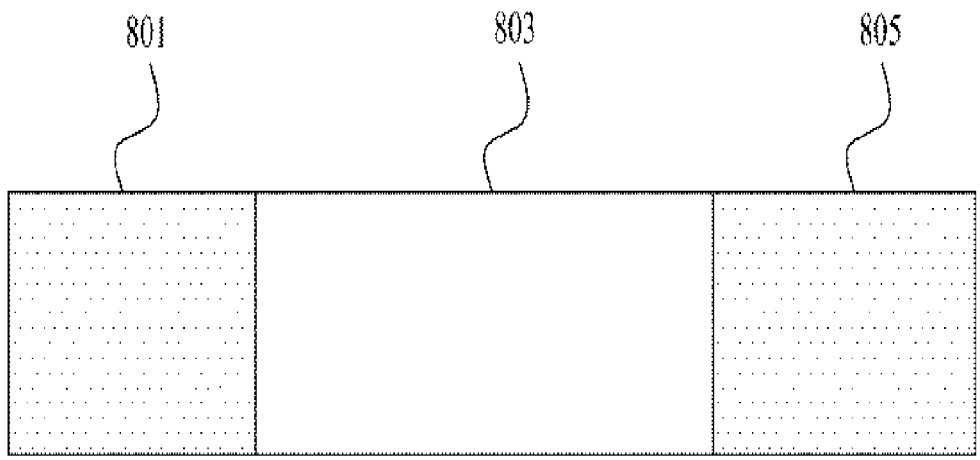
FIG. 8 is a conceptual diagram illustrating a subframe structure for use in a backhaul link according to the present invention.

FIG. 8 is a conceptual diagram illustrating a subframe structure for use in a backhaul link according to the present invention.

Referring to FIG. 8, subframes transmitted via a backhaul link may be classified into a variable interval 801 or 805 and a fixed interval 803 according to a backhaul design scheme. In the variable interval 801 or 805, the relay node (RN) is unable to receive signals. In the fixed interval 803, the relay node (RN) is able to receive signals. Referring to FIG. 8, the variable interval 801 or 805 may correspond to a transmission interval 711 of the relay node (RN) and a transition interval 712 for transition from the Tx mode to the Rx mode, or may correspond to symbols of a time interval corresponding to a guard interval of the transition interval 714 for transition from the Rx mode to the Tx mode.

For example, in the Long Term Evolution (LTE) system, provided that the number of symbols contained in a normal subframe is 14, the number of available symbols of a backhaul link subframe may be set to any one of 12, 11, 10 or 9 less than 14 indicating the number of symbols of the normal subframe according to the number of PDCCH transmission symbols of the BS. In other words, in the backhaul link subframe, at least one symbol is used as a guard interval, such that it is necessary for the number of available symbols of the backhaul link subframe to be less than 14. Therefore, symbols of the fixed interval 803 can be used as backhaul symbols in the backhaul link subframe.

The variable intervals 801 and 805 may simultaneously exist or only one variable interval 801 or 805 may exist in the backhaul link subframe according to backhaul design methods. For example, the second variable interval 805 may be omitted according to the timing design of the relay node (RN).

The following six references (1) to (6) may be considered in designing reference signals through the aforementioned backhaul link.

(1) In the BS, resources required for control and data channels of the BS may be changed according to traffic amount, channel condition, scheduling priority, etc. If necessary, resources may be statically or semi-statically limited.

(2) In the relay node (RN), resources required for control and data channels of the relay node (RN) may be changed according to traffic amount, channel condition, scheduling priority, etc. If necessary, resources may be statically or semi-statically limited.

(3) The subframe structure used for the backhaul link may be changed according to the number of OFDM symbols contained in either the control channel of the BS or the control channel of the relay node (RN).

(4) Provided that the subframe structure of the backhaul link is changed, the reference signal must be designed to minimize the influence of demodulation performance of control and data channels transmitted via a backhaul, such that it can minimize the influence of demodulation performance even when the number of symbols used per subframe is changed.

(5) Resource allocation in a time-, frequency- or code-region of a reference signal must be designed to maximize demodulation performance of control and data channels used for a backhaul link. In addition, resource allocation must be designed to minimally affect operations of a UE belonging to the BS.

(6) It is necessary for the reference signal to be commonly applied to two subframes even when the amount of subframe resources of a backhaul link is smaller than the amount of normal subframe resources on the basis of the number of OFDM symbols or the number of samples constructing the symbol.

A method for designing the reference signal according to the above-mentioned six design references will hereinafter be described in detail.

Figure 9:
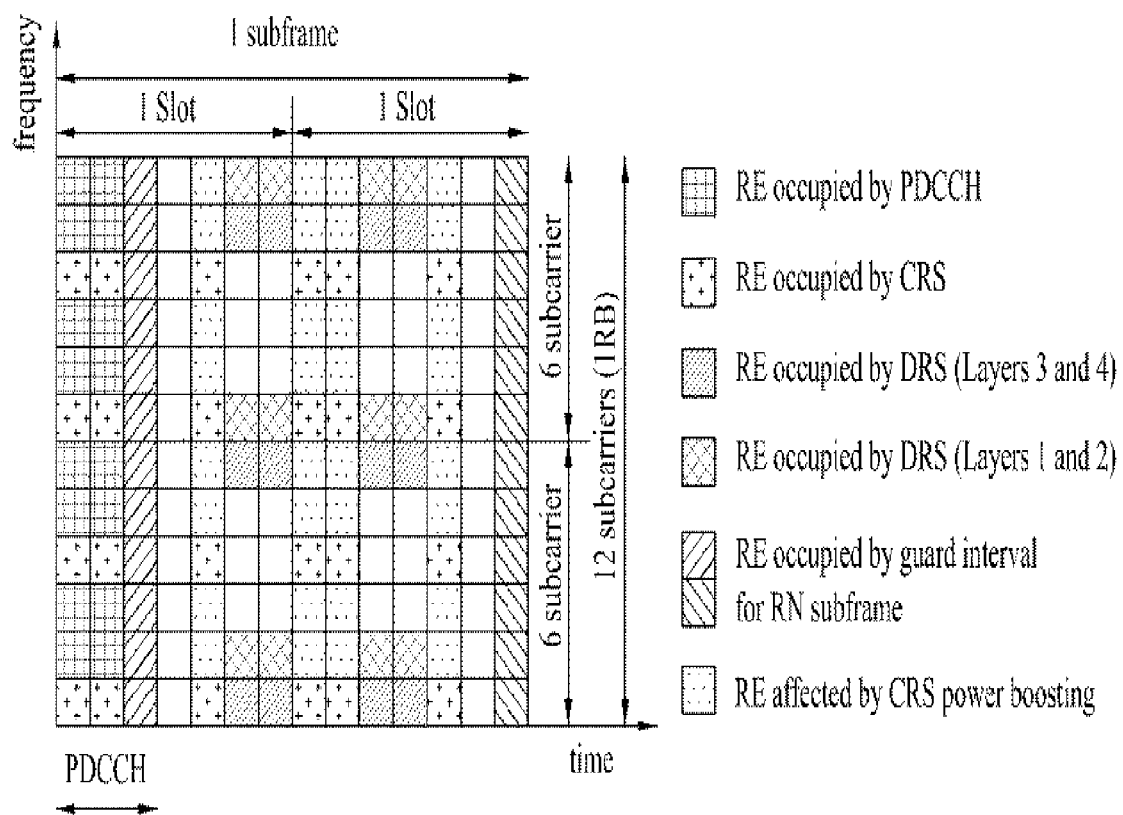
FIG. 9 shows a dedicated reference signal (DRS) pattern for use in a backhaul link subframe according to one embodiment of the present invention.

FIG. 9 shows a dedicated reference signal (DRS) pattern for use in a backhaul link subframe according to one embodiment of the present invention.

Provided that the number of Tx antennas is 4, if the DRS is mapped to one resource block in consideration of the aforementioned reference signal design references, a total of 24 DRSs can be assigned in the backhaul link subframe.

In this case, symbols from first two symbols to four symbols of the backhaul link subframe are assigned to a PDCCH for a control channel. For the transition between the transmission (Tx) mode and the reception (Rx) mode shown in FIG. 9, one symbol after transmission of PDCCH and the last symbol of a subframe are assigned to a guard interval.

As described above, if the system band has a small bandwidth of 1.25 MHz, PDCCH can be transmitted during a maximum of 4 OFDM symbol intervals. In a general case other than a specific case in which the system has the small bandwidth of 1.25 MHz, PDCCH can be transmitted during a maximum of 3 OFDM symbol intervals. It is preferable that the amount of DRS allocation be set to '9' or '10' indicating a minimum number of backhaul symbols on a single resource block (RB) in consideration of the variable interval. If the DRS located in the variable interval of the subframe is transmitted to the relay node (RN), the DRS located in the variable interval may not be transmitted to the relay node (RN), and the backhaul channel demodulation performance of the relay node (RN) may be deteriorated.

Referring to FIG. 9, a dedicated reference signal (DRS or DM RS) may be mapped to an RE spread over two symbols per slot in a backhaul link subframe. For example, as can be seen from FIG. 9, a DRS may be mapped to OFDM symbols having indexes 5 and 6 in a first slot, and may be mapped to OFDM symbols having indexes 2 and 3 in a second slot. The base station (BS) can transmit a DRS that is spread over contiguous symbols contained in a fixed interval of such a backhaul link subframe. The DRS transmission over such contiguous symbols minimizes channel variation between spread REs such that it can minimize channel estimation performance deterioration.

Therefore, as shown in FIG. 9, the DRS may be located in a fixed interval of the subframe.

Figure 10:
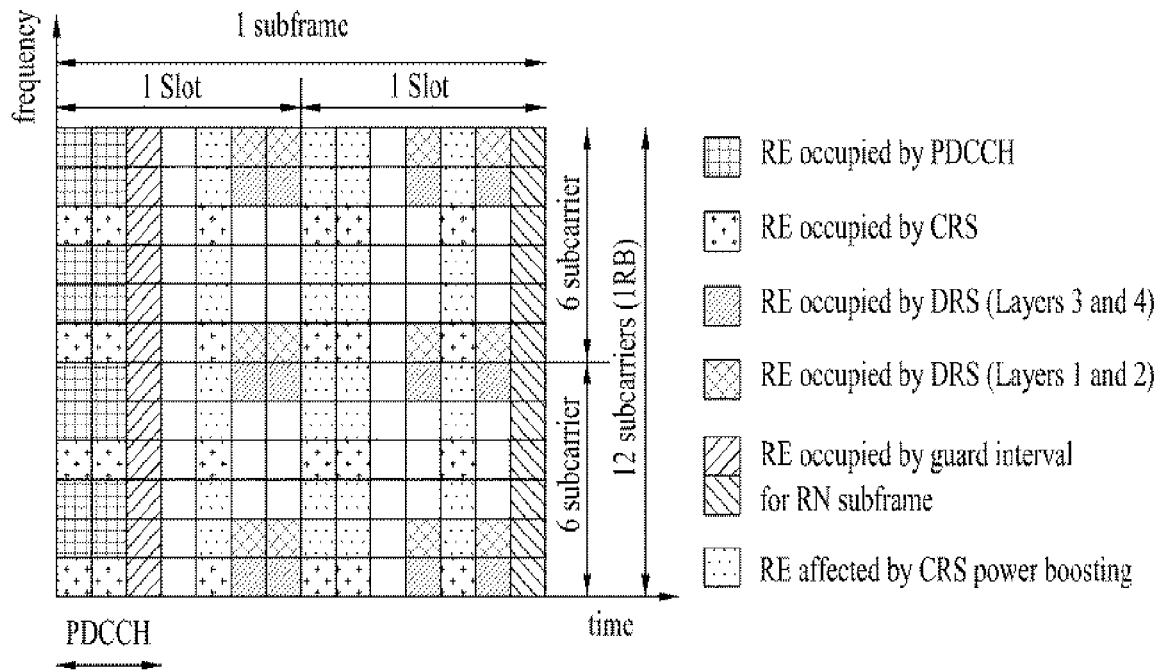
FIG. 10 shows a dedicated reference signal (DRS) pattern for use in a backhaul link subframe according to another embodiment of the present invention.
Figure 10:
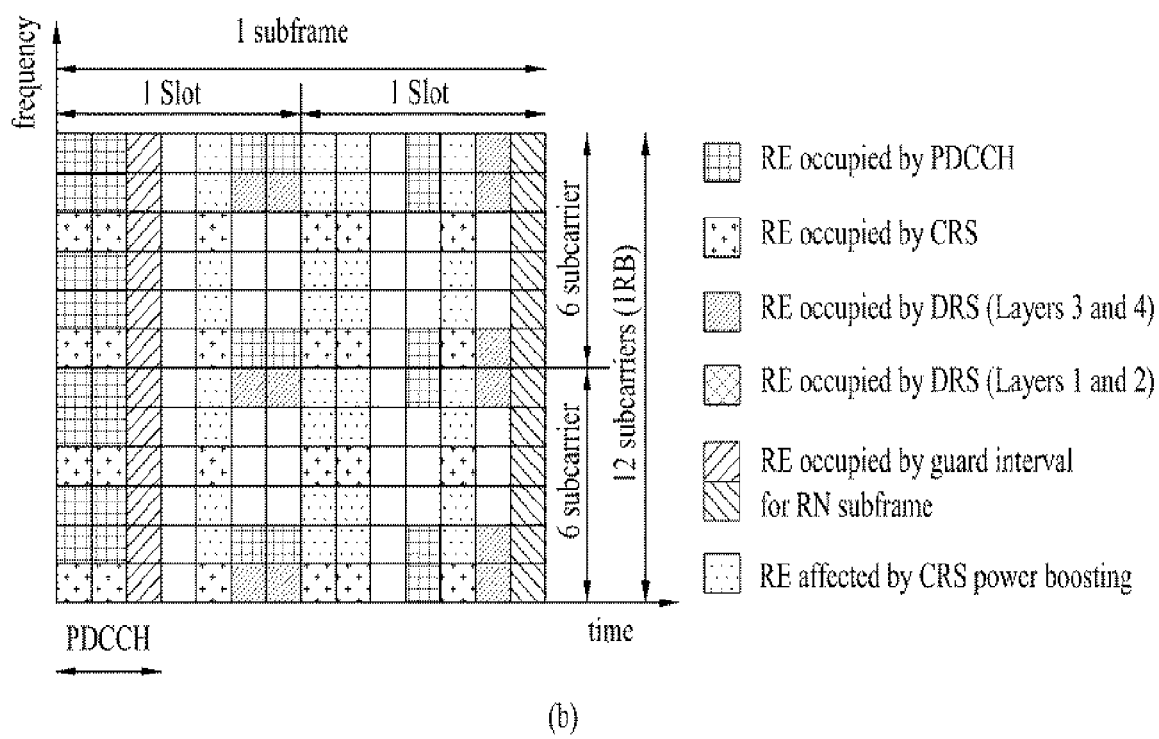

FIG. 10 shows a dedicated reference signal (DRS) pattern for use in a backhaul link subframe according to another embodiment of the present invention. In FIG. 10, DRSs are distributed in a time domain. In this case, the DRSs are arranged at different positions in such a manner that the DRS positions do not overlap with a CRS transmission interval.

Referring to FIG. 10, two DRS groups (i.e., one DRS group is a group of DRS REs located at first slot in the backhaul link subframe, the other group is a group of DRS REs located at second slot in the backhaul link subframe may be spaced apart from each other by a predetermined distance. According to the DRS pattern shown in FIG. 10, the DRS pattern allows two DRS groups to be spaced apart from each other by a predetermined distance, and allows all data REs to be located between the two groups, such that channel estimation interpolation can be sufficiently performed. As a result, a DRS may be transmitted over two non-contiguous symbols (for example, OFDM symbols having indexes 10 and 12).

As shown in FIG. 10(*a*), the DRS may be transmitted in a manner that time-axis spreading is maintained over two non-contiguous symbols. Unlike FIG. 10(*a*), a DRS shown in FIG. 10(*b*) is spread over two non-contiguous symbol in a frequency domain so that channel variation between spread REs can be minimized.

Figure 11:
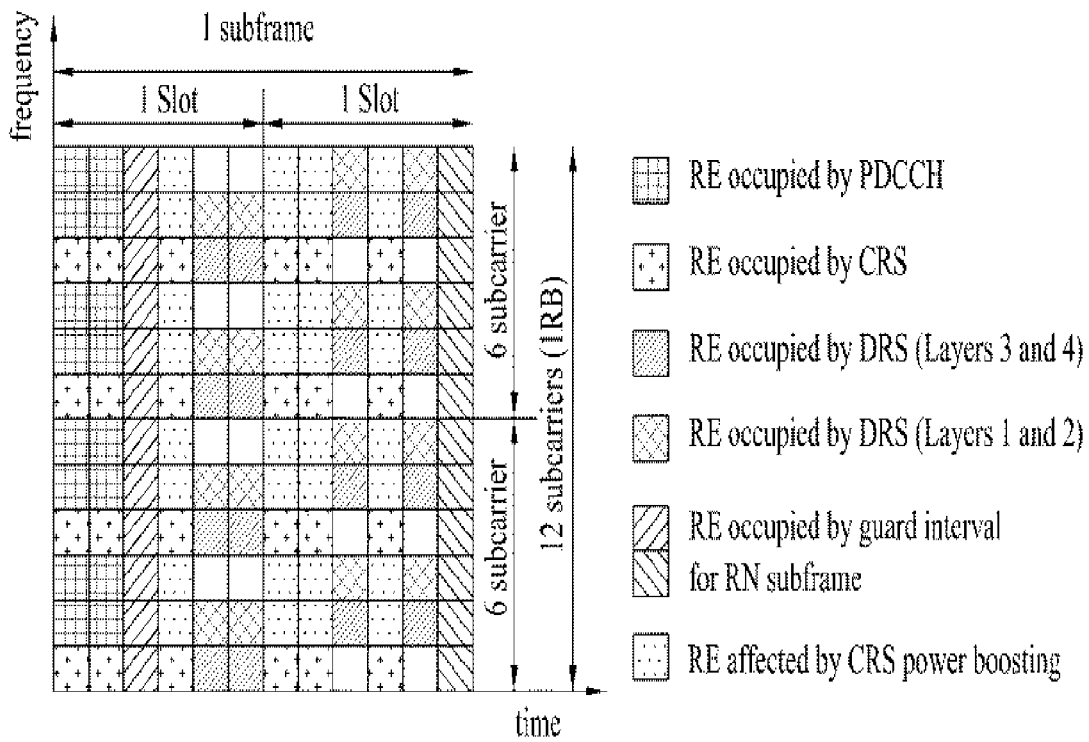
FIGS. 11 and 12 show DRS patterns of a backhaul link subframe for use in the extended CP according to the present invention.
Figure 12:
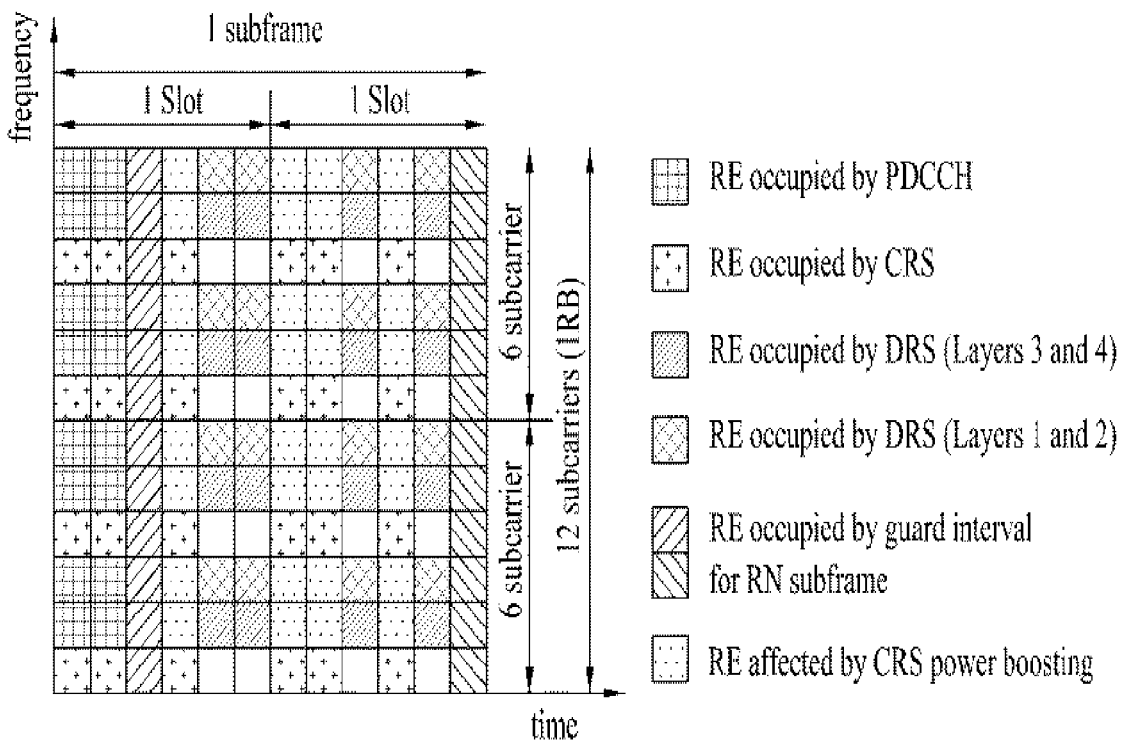

FIGS. 11 and 12 show DRS patterns of a backhaul link subframe to which the extended CP is used according to the present invention. In FIGS. 11 and 12, the DRS may be located in a fixed interval of the backhaul link subframe. Although the DRS is arranged in the fixed interval according to the present invention, the DRS arrangement may be modified in various ways so long as DRSs and CRSs are both distributed in a time axis.

Allocation and transmission of a channel measurement reference signal for channel measurement on the basis of the dedicated reference signal (DRS) pattern will hereinafter be described in detail.

Provided that the number of downlink Tx antennas of the BS is increased and a maximum of 8 Tx antennas is supported, a common reference signal (CRS) for each of the 8 antennas must be supported. For example, the LTE-Advanced system has defined that the BS can support 4 to 8 Tx antennas, such that associated CRS must be additionally defined and designed. In addition, if a maximum of 8 antennas are supported, it is necessary for not only the CRS for channel measurement but also the DRS for data demodulation to be designed.

In the LTE-A system, the UE and the system need to consider backward compatibility between the LTE-A system and the LTE system, such that an LTE UE can operate in an LTE-A system without any problems. From the viewpoint of reference signal (RS) transmission, a reference signal (RS) for a maximum of 8 Tx antenna ports must be additionally defined in a time-frequency domain transmitted at every subframe throughout the entire band. However, in the LTE-A system, if a reference signal (RS) pattern for a maximum of 8 Tx antennas is added to the entire band at every subframe in the same manner as in the CRS of the conventional LTE system, RS overhead may be excessively increased in the LTE-A system. In a system supporting a plurality of Tx antennas, such as the LTE-A system, a newly designed RS includes a channel state information-RS (or channel state indication-RS) (CSI-RS) for channel measurement to select an MCS, a PMI, etc., and a data demodulation-RS (DM-RS) for demodulating data transmitted over 8 Tx antennas. Differently from the aforementioned CRS that is used for channel measurement, handover measurement and data demodulation, the CSI-RS for channel measurement is characterized in that it is designed solely for the purpose of channel measurement. Needless to say, the CSI-RS may also be used for measurement such as handover measurement or the like.

The CSI-RS is transmitted to obtain only channel state information, such that, unlike the CSI, it need not be transmitted at every subframe. Therefore, in order to reduce CRI-RS overhead, the CSI-RS is intermittently transmitted in a time axis. For data demodulation, a DM-RS dedicated for a specific UE scheduled in the corresponding time-frequency domain is transmitted. In other words, the DM-RS of the specific UE may be transmitted only in a specific region in which the corresponding UE is scheduled, i.e., only in a time-frequency domain for receiving data.

The BS must transmit CSI-RSs for all the supported Tx antenna ports. Assuming that the BS supports a maximum of 8 Tx antennas, if the CSI-RS for 8 antenna ports is transmitted at every subframe, overhead is excessively increased. In order to prevent the excessive increase in overhead, it is necessary for the CSI-RS to be intermittently transmitted in a time axis, resulting in reduction in overhead. In other words, the CSI-RS may be periodically transmitted at intervals of an integer multiple of one subframe, or may be transmitted with a specific transmission pattern. In this case, the transmission period or pattern of the CSI-RS may be configured by the BS.

In order to measure the CSI-RS, the UE must recognize various information, for example, a time-frequency position of the CSI-RS for each antenna port of a cell including the UE, a CRI-RS sequence, a CSI-RS frequency shift, etc.

In the LTE system, sequence, time-frequency position, and frequency shift-information of the CRS may be combined or tied by a cell ID, a subframe number, and a symbol number. However, the LTE-A system additionally requires information about transmission period, the transmission offset, etc. to transmit the CSI-RS, and such information may be transmitted from the system to the UE.

In the LTE-A system, the BS transmits the CSI-RS at a maximum of 8 antenna ports, and resources used for transmitting the CRI-RS to different antenna ports must be orthogonal to each other. When one BS transmits the CSI-RS to different antenna ports, resources may be arranged to be orthogonal to each other according to a FDM scheme in which CSI-RSs for individual antenna ports are mapped to different frequencies, or resources may be transmitted according to a CDM scheme in which the CSI-RS for different antenna ports are mapped to orthogonal codes.

When the BS transmits the CSI-RS, a distinction between CSI-RSs for different antenna ports can be achieved by mapping CSI-RSs of individual antenna ports to different resource elements (REs) using the FDM scheme. It is preferable for the CSI-RS for one antenna port to occupy one or two REs per RB.

Therefore, the BS need to transmit the CSI-RS for a maximum of 8 antenna ports, such that about 16 REs are required per CSI-RS transmission period to support 8 Tx antennas. Although the CDM scheme is used to distinguish between antenna ports, REs (i.e., 16 REs) similar to those of the FDM scheme are needed for CSI-RS mapping.

The RE for CSI-RS transmission may puncture data of a data channel region such as a PDSCH and transmit the punctured resultant data. If the BS transmits CSI-RSs for all antenna ports to one subframe, 16 REs per RB are used for CSI-RS transmission in the corresponding subframe, thus negatively influencing performance of a data channel (PDSCH) of the LTE UE. In order to prevent such negative influence upon PDSCH performance of the LTE UE, UEs are not scheduled in the subframe for CSI-RS transmission. As a result, the PDSCH performance of the LTE UE is maintained.

In another method, when the UE is scheduled in the subframe via which the CSI-RS is transmitted, the UE may be scheduled at a low MCS (Modulation and Coding Scheme) level. That is, provided that the BS performs scheduling to the corresponding UE at a high MCS level, data performance of the corresponding UE is heavily deteriorated when a data channel (PDSCH) of the UE is punctured, such that it is necessary for the BS to perform scheduling at a low MCS level so as to prevent data demodulation performance from being deteriorated.

In another method, the number of REs punctured during the CSI-RS transmission is minimized, such that UE performance deterioration caused by data transmission through the punctured PDSCH region is prevented. For the UE performance deterioration prevention, CSI-RSs for all the antenna ports are not simultaneously transmitted and are transmitted to different subframes.

When the BS informs a UE contained in the BS serving-cell of the CSI-RS information, it first informs the UE of time-frequency information mapped to the CSI-RS of each antenna port. A variety of time information is transmitted from the BS, e.g., a number of subframes via which CSI-RS is transmitted, a number of symbols via which CSI-RS of a specific antenna is transmitted, a transmission period of the CSI-RS, subframe and symbol offsets associated with CSI-RS transmission, an offset or shift of an RE in a time axis, frequency spacing, etc.

Eight CSI-RSs may be simultaneously transmitted in one subframe or may be transmitted over several subframes.

Preferably, the CSI-RS mapping spacing in resource blocks (RBs) may be set to the spacing of 6 REs to increase the accuracy of channel measurement when a CSI-RS for one antenna port is mapped to the time-frequency domain. In addition, the operation in which REs used for CSI-RS transmission are distributed to several symbols in one subframe is advantageous to error distribution between codewords.

Figure 13:
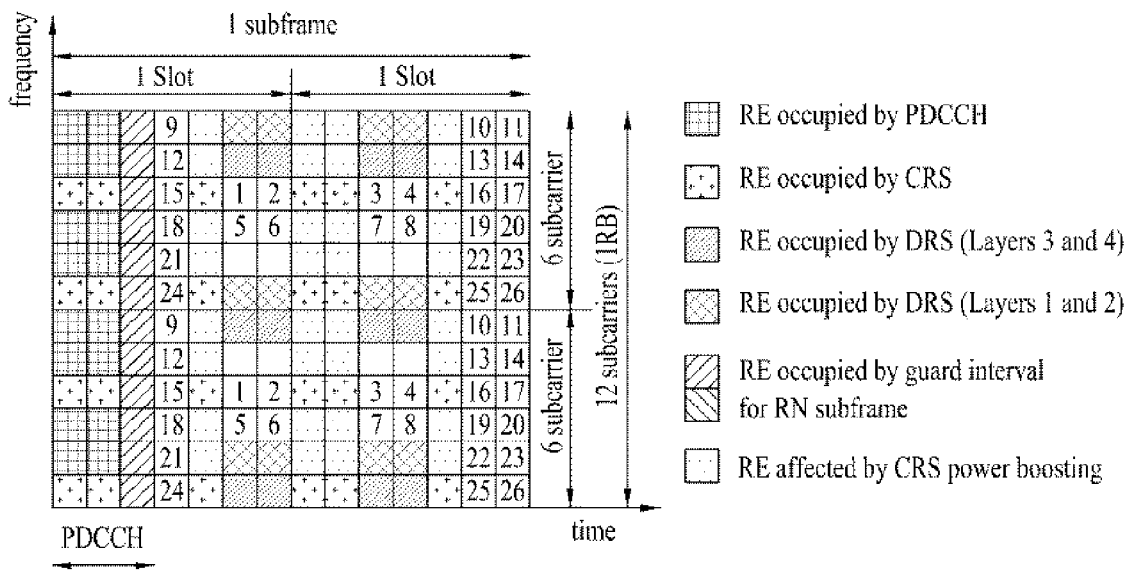
FIG. 13 shows a Channel State Information-Reference Signal (or Channel State Indication-Reference Signal) (CSI-RS) pattern of a backhaul link subframe according to one embodiment of the present invention.

FIG. 13 shows a Channel State Information-Reference Signal (or Channel State Indication-Reference Signal) (CSI-RS) pattern of a backhaul link subframe according to one embodiment of the present invention.

If the dedicated reference signal (DRS) pattern is applied to the backhaul link subframe, RE sets, each of which can be assigned a CSI-RS, may be selected from among candidate REs having numbers shown in FIG. 13.

Figure 14:
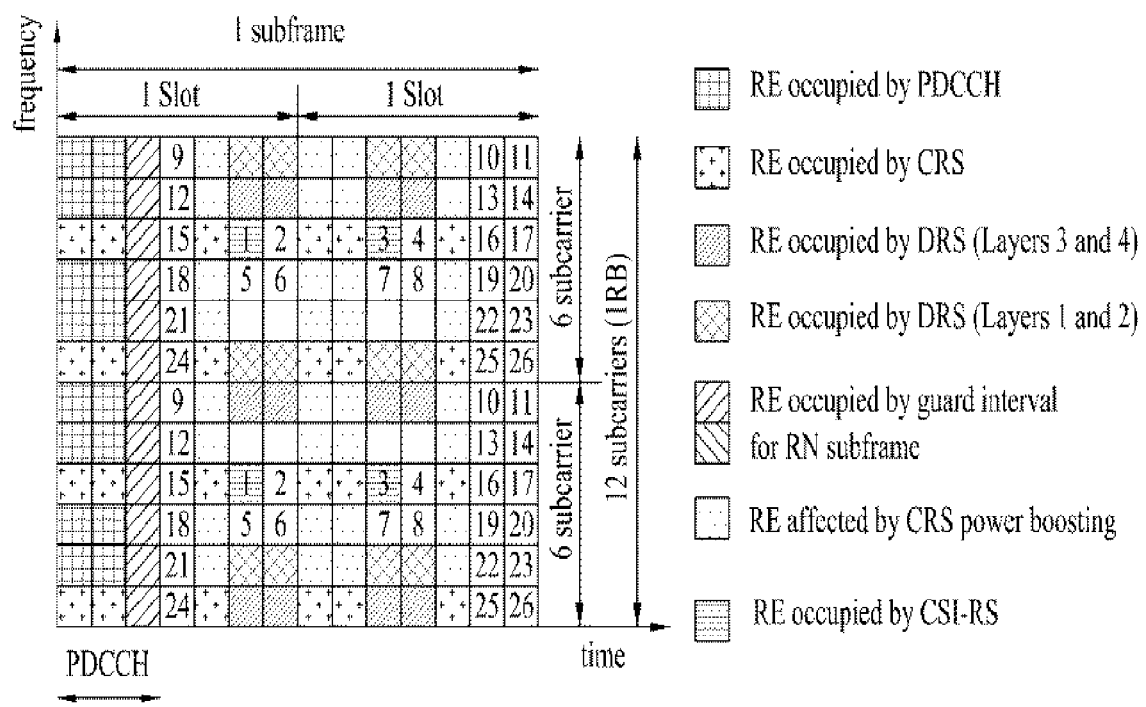
FIG. 14 shows a subframe pattern mapped to a CSI-RS of two antennas according to the present invention.

Referring to FIG. 13, the same numbers from among numbers written in individual REs may indicate the set of CSI-RSs for one antenna port. Provided that two REs are allocated for CSI-RS transmission for one antenna port per RB, a maximum of 26 CSI-RS sets is utilized as shown in FIG. 14.

Preferably, in order to prevent CSI-RS collision between neighbor cells, CSI-RS may be transmitted using different sets in individual cells, or different CSI-RS transmission positions are assigned to individual subframes and the resultant CSI-RSs are transmitted.

In this case, the BS informs the relay node (RN) or the UE of shift or offset information of the time/frequency domains.

In a subframe in which the relay node (RN) has to receive the CSI-RS, it is necessary for the BS to avoid mapping the CSI-RS to a symbol incapable of being received by the relay node (RN) in consideration of a downlink backhaul action of the relay node (RN). However, considering another case in which the relay node (RN) does not perform the downlink backhaul action, it is not necessary for the CSI-RS to be limited to specific symbols.

Therefore, as can be seen from FIG. 13, the RE set in which CSI-RS mapping is made available even in the guard interval of the subframe is discriminated, such that it is possible to perform CSI-RS allocation through the RE set as necessary.

FIG. 14 shows a subframe pattern mapped to a CSI-RS of two antennas according to the present invention. Assuming that the CSI-RS for two antenna ports is transmitted through one subframe, two RE sets are selected from among 26 RE sets indicating all the CSI-RS allocable RE sets.

CSI-RS allocation is achieved by puncturing REs for allocating UE data, such that it is preferable that symbols for CSI-RS transmission be evenly distributed.

Referring to FIG. 14, in the case where the CSI-RS for two antenna ports is transmitted in a specific subframe, an RE set numbered with '1' and an RE set numbered with '3' are selected for transmission of the CSI-RS of two specific antenna ports, information about the CSI-RS mapping position is transmitted to the UE, the CSI-RS is mapped to the corresponding RE, and the CSI-RS mapping result is transmitted to the UE.

In this case, it is preferable that a reference set used for CSI-RS transmission be established in each UE or each cell. That is, the BS may inform the UE that uses an RE set numbered with '1' as a reference set, of another CSI-RS transmission position using either an increase of a number or a time-frequency shift value. If necessary, the BS must decide the position of each RE used to transmit the CSI-RS for the same antenna port in another subframe.

If the CSI-RS for all antenna ports is transmitted in one subframe, 8 CSI-RS sets (i.e., a total of 16 REs) are selected from among 26 mapping REs shown in FIG. 13, the CSI-RS is mapped to the 8 CSI-RS sets, and thus the CSI-RS mapping result is transmitted. In this case, the CSI-RS mapping position may be statically operated in each cell.

When a CSI-RS is transmitted over several subframes, it is possible for a CSI-RS for different antenna ports to be transmitted to the same RE positions in different subframes. For example, a CSI-RS for an antenna port numbered with '1' may be transmitted to the set numbered with '1' in a subframe numbered with '1', and a CSI-RS for an antenna port numbered with '3' may then be transmitted to the set numbered with '1' in a subframe numbered with '2'. In this case, when the BS informs the relay node (RN) or the UE of the CSI-RS transmission position, the BS may inform the relay node (RN) or the UE of the CSI-RS transmission subframe position (offset) for each antenna, symbol-frequency position information (offset, shift, or number set), an offset for each antenna, etc.

Figure 15:
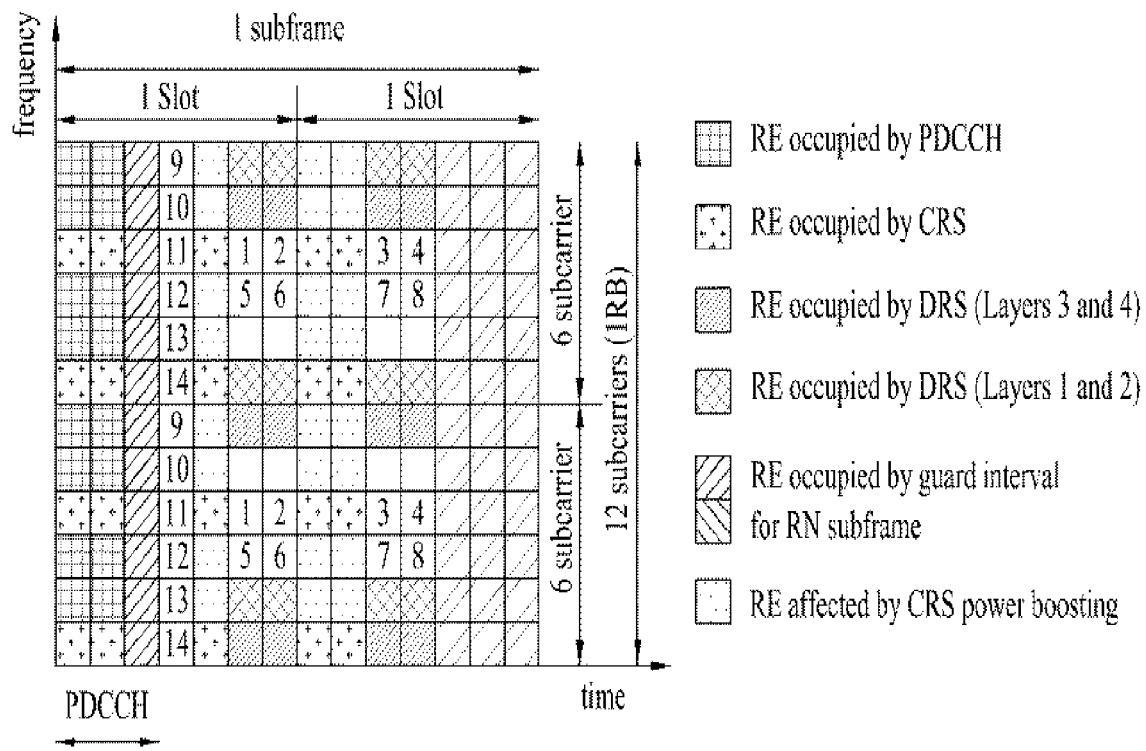
FIG. 15 shows an RS pattern for use in a special subframe according to the present invention.

FIG. 15 shows an RS pattern for use in a special subframe according to the present invention.

Referring to FIG. 15, a special subframe for a TDD type may include a Downlink Pilot Time Slot (DwPTS), a guard period (GP), and an Uplink Pilot Time Slot (UpPTS). Therefore, it is impossible to transmit data in a symbol interval corresponding to GP or UpPTS, such that the CSI-RS is mapped on the basis of symbols capable of transmitting data and the CSI-RS mapping result is transmitted.

In this case, an RE set mapped to the CSI-RS can be selected in the same manner as in the aforementioned method.

Figure 16:
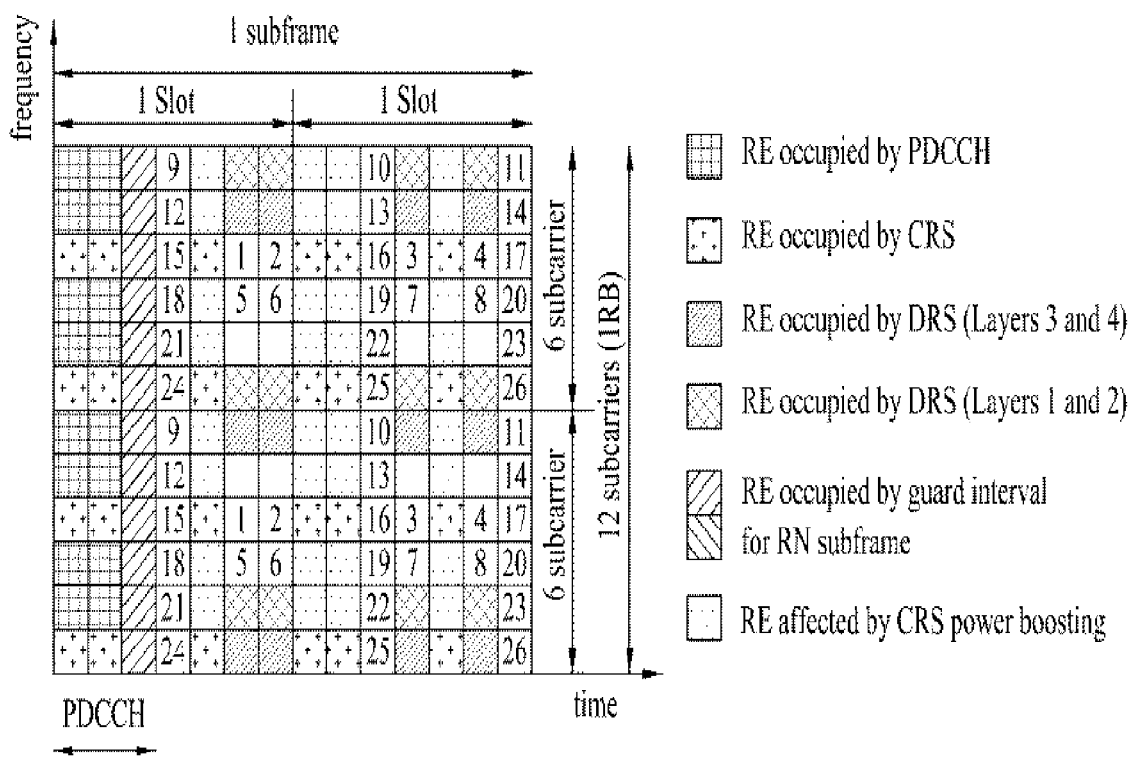
FIGS. 16 and 17 show CSI-RS patterns of a backhaul link subframe according to another embodiment of the present invention, and specifically show the CSI-RS pattern for use in the extended CP.
Figure 17:
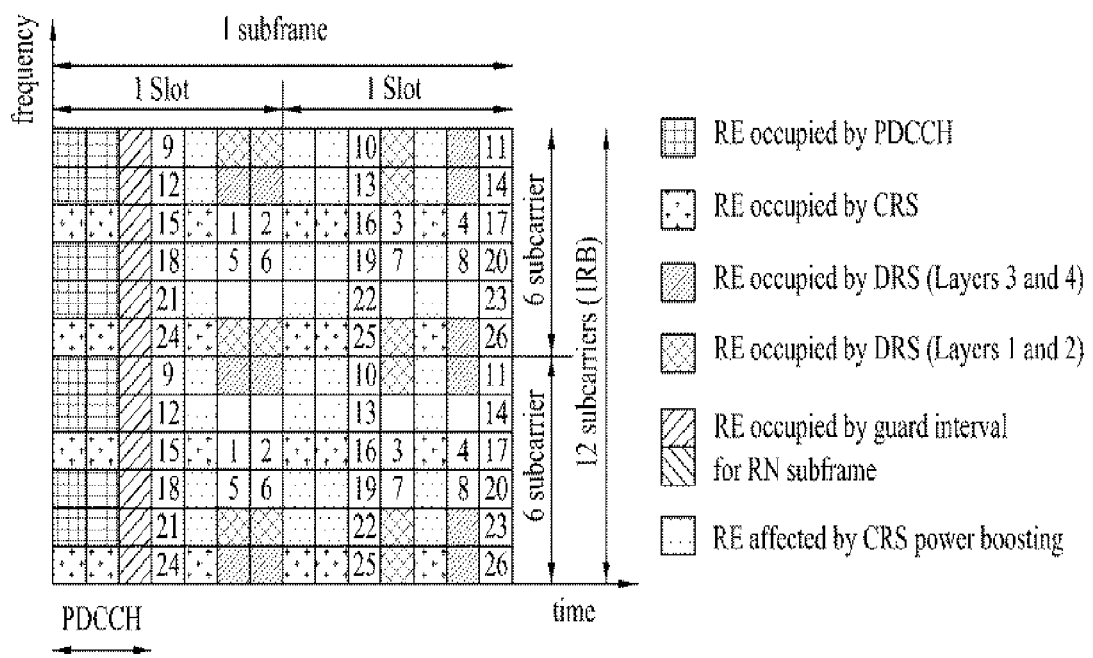

FIGS. 16 and 17 show CSI-RS patterns of a backhaul link subframe according to another embodiment of the present invention, and specifically show the CSI-RS pattern in a backhaul link subframe to which the extended CP is used.

In the same manner as in the embodiment of FIG. 13 showing the CSI-RS transmission pattern for use in a subframe having a normal CP structure, REs used for CSI-RS transmission for each antenna port are arranged at intervals of 6 REs.

Compared to FIG. 13, the number of symbols per subframe slot in FIG. 16 or 17 is less than that of FIG. 13, such that the number of CSI-RS allocable REs in FIG. 16 or 17 is further reduced.

The DRS transmission pattern shown in FIG. 16 is different from that of FIG. 17, whereas the CSI-RS transmission pattern shown in FIG. 16 is identical to that of FIG. 17. Although the DRS is not designed in a symbol on the assumption that the relay node (RN) does not receive the last symbol, the BS has to avoid mapping the CSI-RS to a symbol incapable of being received by the RN in consideration of a specific case in which the RN performs a downlink backhaul in a subframe in which the RN has to receive the CSI-RS. However, considering another case in which the RN does not perform a downlink backhaul, it is not necessary for CSI-RS mapping to be restricted to specific symbols.

Therefore, as can be seen from FIGS. 16 and 17, the RE set in which CSI-RS mapping is made available even in a guard interval symbol of the subframe is identified, such that it is possible to perform CSI-RS allocation through the RE set as necessary.

A method for determining the RE position to which the CSI-RS is transmitted is identical to the method for determining the CSI-RS position in a normal CP shown in FIGS. 13 and 14, and as such a detailed description thereof will herein be omitted for convenience of description.

Figure 18:
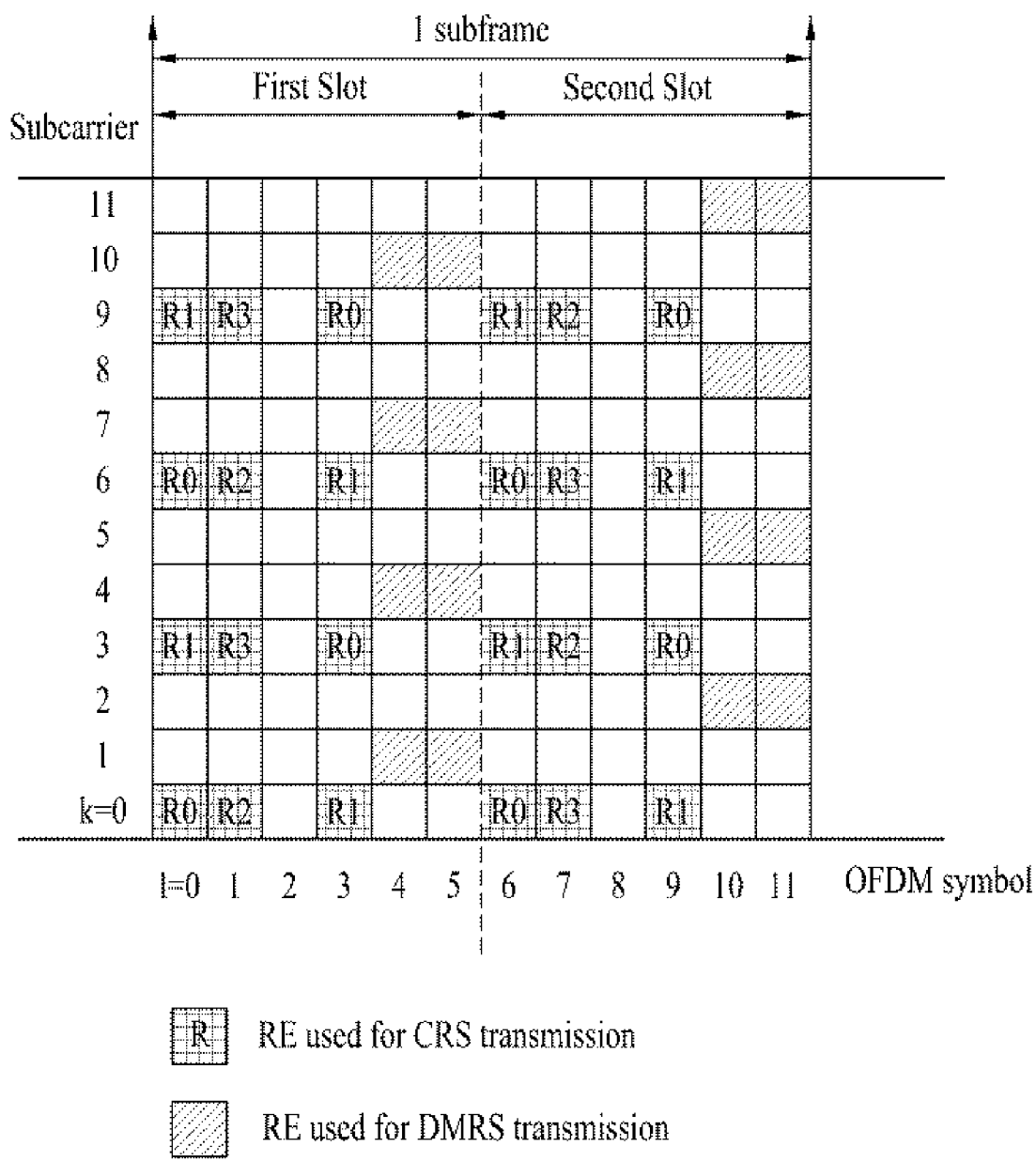
FIG. 18 shows an example of a DM RS pattern between a BS and a UE when the extended CP is used.

FIG. 18 shows an example of a DM RS pattern in a specific subframe between the BS and the RN in which the extended CP is applied.

FIG. 18 shows a DM RS pattern between the BS and the RN when the extended cyclic prefix (CP) is used. In FIGS. 18, R0, R1, R2, and R3 indicate an RE used in CRS port 0, an RE used in CRS port 1, an RE used in CRS port 2, and an RE used in CRS port 3, respectively. One DM RS port is CDM-spread over two neighbor OFDM symbols, and the CDM-spread result is then transmitted.

The RN may not receive a signal from the BS in the last OFDM symbol (i.e., an OFDM symbol having an index of 11) of the backhaul link subframe (also known as a backhaul subframe) according to conditions. Specifically, in the case where an access link subframe boundary of the RN is time-aligned with a subframe boundary of the BS in a Time Division Duplex (TDD) system, and the Rx/Rx switching time of the RN is not very short, the RN is switched to a transmission mode without receiving a signal in the last symbol of the corresponding backhaul link subframe so as to prepare for signal transmission at a first OFDM symbol of the next subframe subsequent to the aforementioned backhaul link subframe. In this case, the RN is unable to receive a DM RS over the last two symbols (i.e., OFDM symbol having index 10 and OFDM symbol having index 11), resulting in reduction in channel estimation performance.

In order to solve the above problems, if the RN is unable to receive the last OFDM symbol of the corresponding backhaul link subframe, the present invention proposes a method for shifting the DM RS over the last two OFDM symbols to an appropriate OFDM symbol preceding the last two OFDM symbols.

Figure 19:
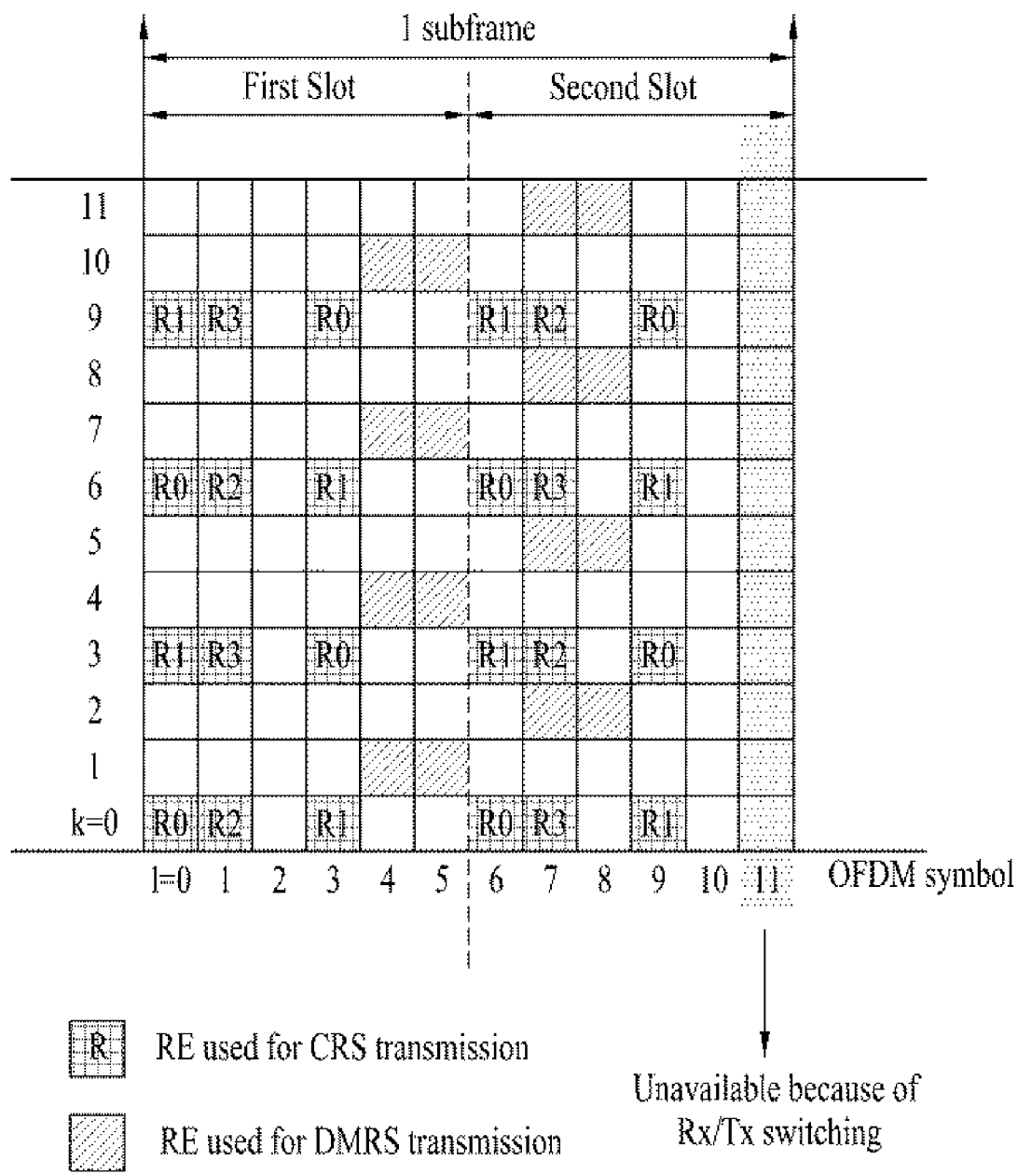
FIG. 19 shows another example of a DM RS pattern between a BS and a UE when the extended CP is used.

FIG. 19 shows another example of a DM RS pattern in a specific backhaul subframe between the BS and the RN in which the extended CP is applied.

Referring to FIG. 19, it can be recognized that the positions of an RE occupied by the DM RS are shifted to those of OFDM symbols having indexes 7 and 8 in the corresponding backhaul link subframe. For example, as can be seen from FIG. 19, the BS may transmit a DM RS through OFDM symbols having indexes 7 and 8 in a time axis and subcarriers having subcarrier indexes 2, 5, 8 and 11 in a frequency axis of the corresponding backhaul link subframe to the RN. That is, the processor of the BS may control the DM RS to be transmitted through the OFDM symbols having indexes 7 and 8 in a time axis and subcarriers having subcarrier indexes 2, 5, 8 and 11 in a frequency axis of the corresponding backhaul link subframe to the RN.

In this case, since the DM RS located in the last two OFDM symbols of the corresponding backhaul link subframe is shifted to other OFDM symbols having indexes 7 and 8, the channel estimation performance deterioration caused by the RN that does not receive the DM RS locatedover the last two symbols (i.e., OFDM symbols indexes 10 and 11) can be solved.

However, since REs at which a DM RS is located are shifted, a DM RS is transmitted along with CRS ports 2 and 3 at an OFDM symbol having an index 7. If the DM RS is transmitted at an OFDM symbol where a CRS is transmitted, power allocated to the DM RS may be insufficient due to CRS power boosting. Otherwise, if shifting (also called 'v-shifting') is applied to a subcarrier, there is a possibility of collision between a CRS and a DM RS.

However, assuming that the BS is operated under the condition that the number of CRS ports is limited to 2 (i.e., under the condition that the CRS ports 0 and 1 are transmitted), collision between the CRS and the DM RS and lack of power allocated to the DM RS can be solved. In addition, the DM RS is allocated to two contiguous OFDM symbols (e.g., OFDM symbols having indexes 7 and 8) and is then CDM-coded, such that orthogonality between DM RS ports is well maintained, resulting in increased communication performance.

Figure 20:
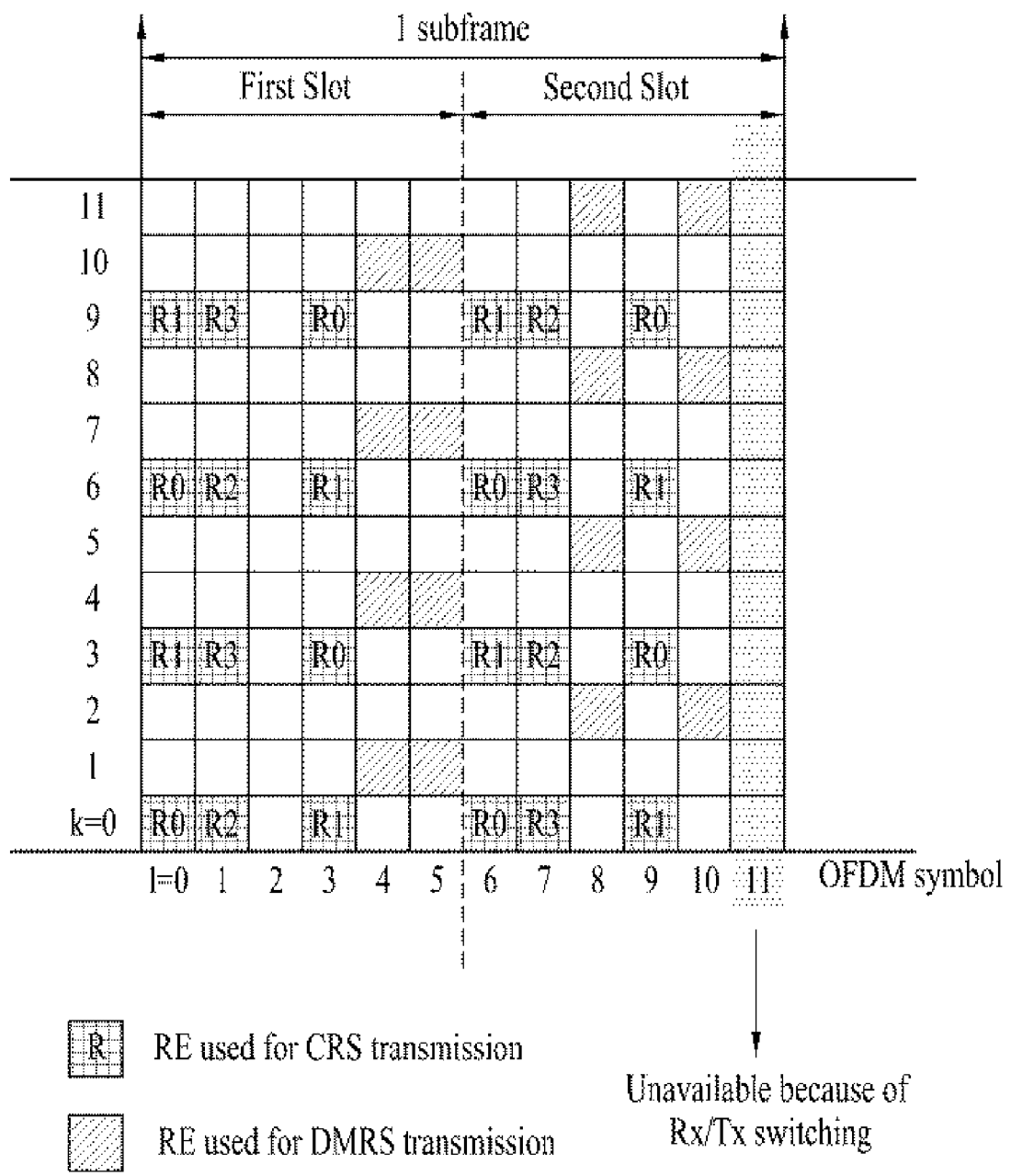
FIG. 20 shows another example of a DM RS pattern between a BS and a UE when the extended CP is used.

FIG. 20 shows another example of a DM RS pattern in a specific backhaul subframe between the BS and the RN in which the extended CP is applied.

Referring to FIG. 20, the DM RS may be shifted to OFDM symbols having indexes 8 and 10, differently from FIG. 19 showing that the RE position occupied by the DM RS is shifted to OFDM symbols having indexes 7 and 8 in the corresponding backhaul link subframe. In this case, in order to avoid coexistence with the CRS located at the OFDM symbol having an index 9, the DM RS pattern is designed in such a manner that the DM RS is not transmitted at an OFDM symbol having an index 9. For example, as shown in FIG. 20, the DM RS may be transmitted through OFDM symbols having indexes 8 and 10 in a time axis and subcarriers having subcarrier indexes 2, 5, 8 and 11 in a frequency axis of the corresponding backhaul link subframe. That is, the processor of the BS controls the DM RS to be transmitted through OFDM symbols having indexes 8 and 10 in a time axis and subcarriers having subcarrier indexes 2, 5, 8 and 11 in a frequency axis of the corresponding backhaul link subframe.

DM RS may be mapped either in a manner that the DM RS is spread over two non-contiguous symbols either in a time axis or in a frequency axis. If the DM RS is spread over two symbols in the frequency axis and is transmitted, channel variation between the spread REs can be minimized.

According to the above-mentioned DM RS pattern, the DM RS is not transmitted from the same OFDM symbol index as in the CRS, power required for DM RS transmission is sufficient and the collision between the DM RS and the CRS is also solved.

Figure 21:
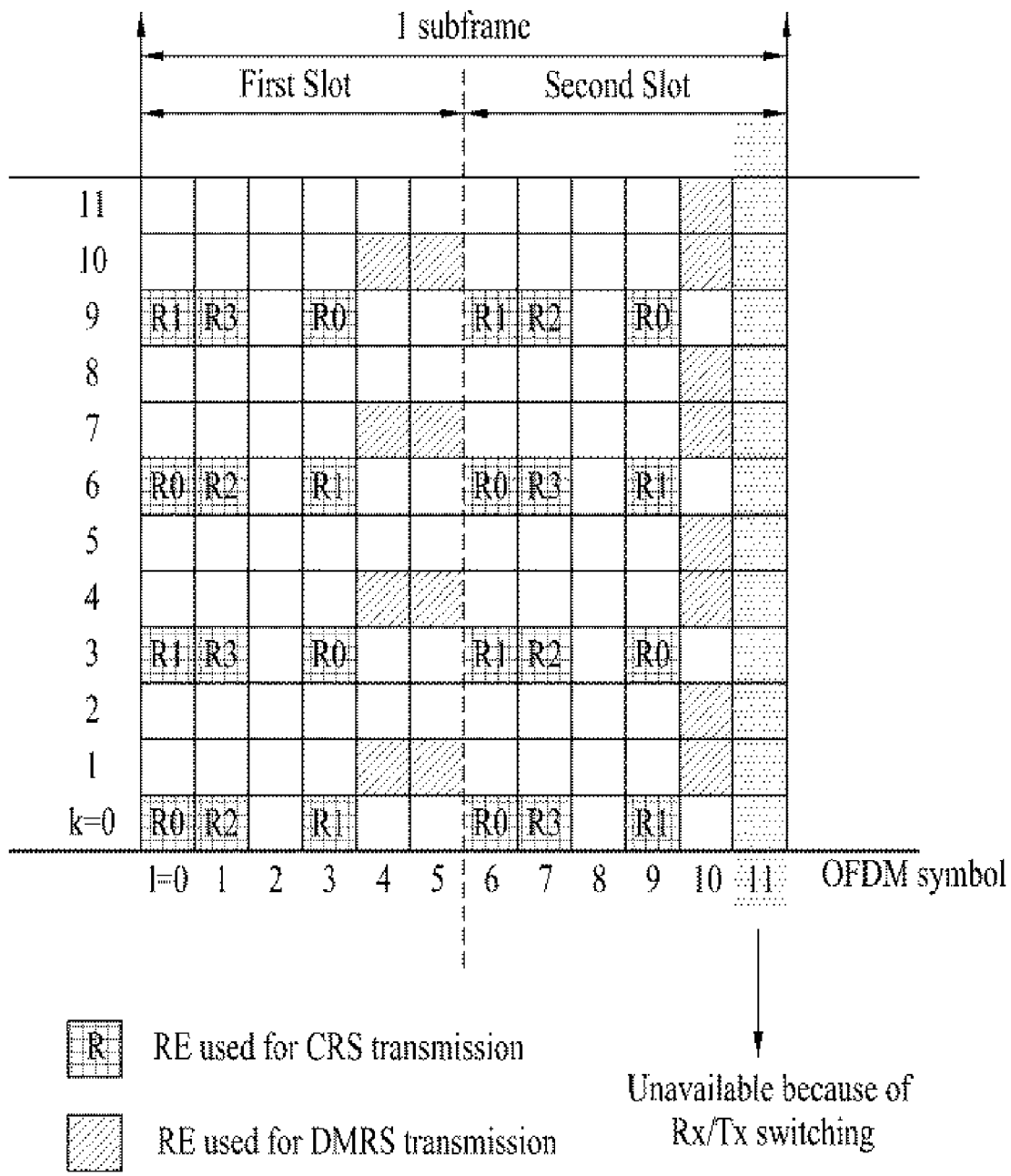
FIGS. 21 and 22 show additional examples of a DM RS pattern between a BS and a UE when the extended CP is used.
Figure 22:
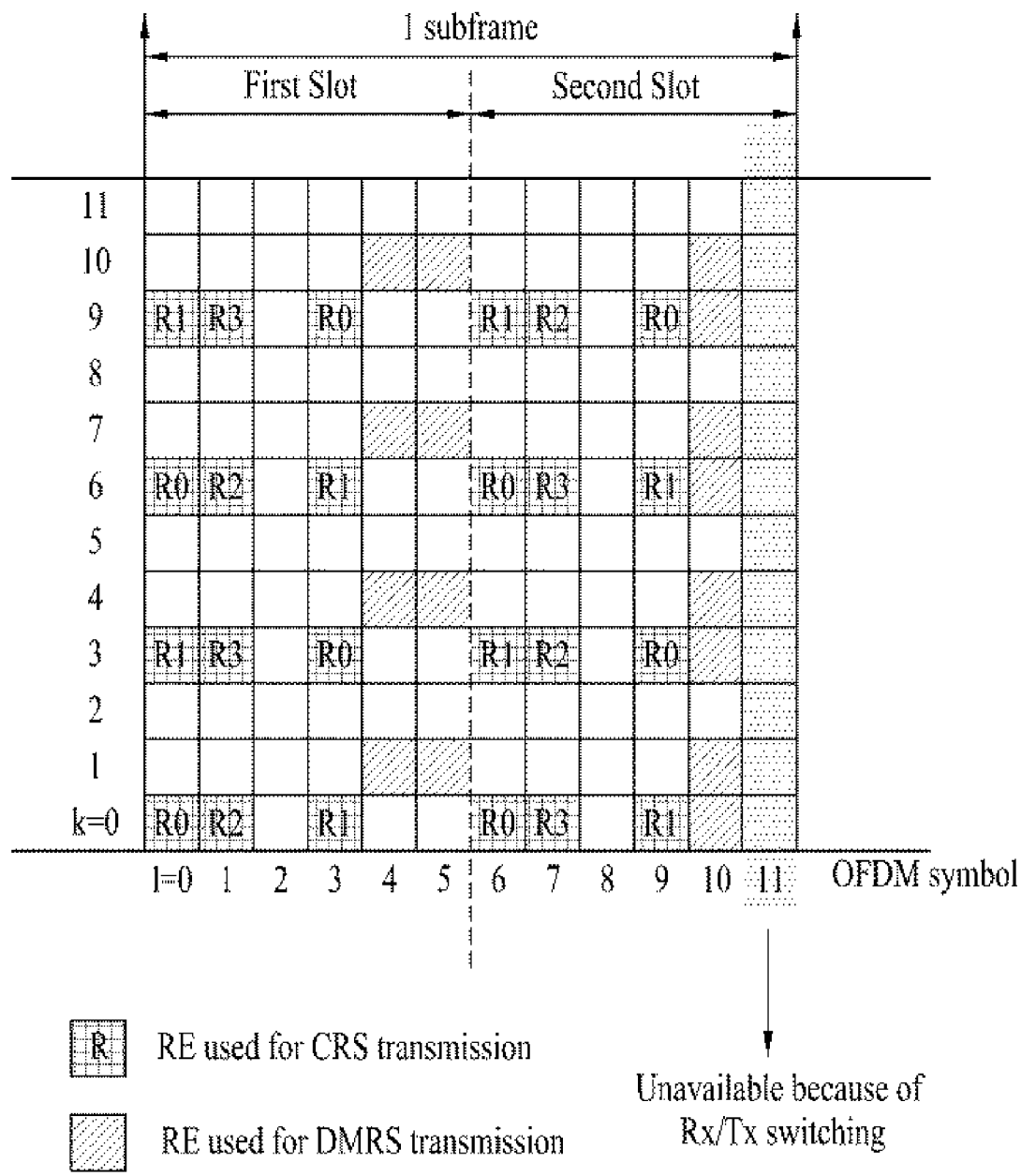

FIGS. 21 and 22 show additional examples of a DM RS pattern in a specific backhaul subframe between the BS and the RN in which the extended CP is applied.

FIGS. 21 and 22 illustrate another example of the DM RS pattern according to the present invention. In FIGS. 21 and 22, the DM RS is transmitted by the BS to the RN only at an OFDM symbol having an index of 10 in a second slot of the corresponding backhaul link subframe. In this case, the DM RS may be transmitted according to a specific pattern spread in the subcarrier region. For example, as shown in FIG. 21, the DM RS is mapped to subcarriers having subcarrier indexes 1, 2, 4, 5, 7, 8, 10 and 11 at an OFDM symbol having an index 10 of the corresponding backhaul link subframe, and the mapped result is then transmitted to the RN. In this manner, the processor of the BS controls the DM RS to be mapped to subcarriers having subcarrier indexes 1, 2, 4, 5, 7, 8, 10 and 11 at the OFDM symbol having an index 10 of the corresponding backhaul link subframe, such that it can transmit the resultant DM RS to the RN.

In another example, as shown in FIG. 22, a DM RS is mapped by the BS to subcarriers having subcarrier indexes 0, 1, 3, 4, 6, 7, 9 and 10 at an OFDM symbol having an index 10 of the corresponding backhaul link subframe, and the mapped result may be transmitted by the BS to the RN. Likewise, the processor of the BS controls the DM RS to be mapped to subcarriers having subcarrier indexes 0, 1, 3, 4, 6, 7, 9 and 10 at an OFDM symbol having an index 10 of the corresponding backhaul link subframe, such that it can transmit the mapped DM RS result to the RN.

When the BS transmits the resultant DM RS mapped in the aforementioned pattern to the RN, it is possible to solve the DM-RS power deficiency encountered when the DM RS is transmitted at the same OFDM symbol as in the CRS, CDM is successively applied to two REs and orthogonality between DM RS ports is guaranteed, resulting in increased communication performance. In general, because channel variation in a frequency axis is more greatly changed than in a time axis, DM RS is spread in the frequency axis and mapped to REs as shown in FIG. 21, resulting in increased channel estimation performance.

The receiver of the RN receives the DM RS transmitted according to the patterns shown in FIGS. 19 to 22 from the BS, and the processor of the RN can decode the corresponding REs receiving the DM RS.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. Also, it will be obvious to those skilled in the art that claims that are not explicitly cited in the appended claims may be presented in combination as an exemplary embodiment of the present invention or included as a new claim by subsequent amendment after the application is filed.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

Mode For The Invention

Various embodiments have been described in the best mode for carrying out the invention.

Industrial Applicability

The apparatus and method for transmitting and receiving a demodulation reference signal (DM RS) according to the embodiments of the present invention are applicable to various wireless communication systems including a 3GPP LTE system, an LTE-A system, and/or an IEEE 802.xx system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting a demodulation reference signal (DM RS) at a base station (BS) in a wireless communication system, the method comprising:
    determining whether a downlink subframe is a normal subframe or a backhaul subframe;
    mapping the DM RS on resource elements (REs) of the backhaul subframe if the downlink subframe is the backhaul subframe, the REs excluding orthogonal frequency division multiplexing (OFDM) symbols corresponding to a physical downlink control channel (PDCCH) and a guard time, the guard time for a mode transition of a relay node (RN) between a reception mode and a transmission mode; and
    transmitting the DM RS for to the RN through the backhaul subframe,
    wherein subcarrier frequency indexes of the REs are 2, 5, 8 and 11 in a frequency axis within a second slot of the backhaul subframe if an extended cyclic prefix (CP) is applied to the backhaul subframe.

2. The method according to claim 1, wherein OFDM symbol indexes of the REs are 7 and 8 or 8 and 10 in the time axis if the extended cyclic prefix (CP) is applied to the backhaul subframe.

3. A method for transmitting a demodulation reference signal (DM RS) at a base station (BS) in a wireless communication system, the method comprising:
    determining whether a downlink subframe is a normal subframe or a backhaul subframe;
    mapping the DM RS on resource elements (REs) of the backhaul subframe if the downlink subframe is the backhaul subframe, the REs excluding orthogonal frequency division multiplexing (OFDM) symbols corresponding to a physical downlink control channel (PDCCH) and a guard time, the guard time for a mode transition of a relay node (RN) between a reception mode and a transmission mode; and
    transmitting the DM RS to the RN through the backhaul subframe,
    wherein the REs are located in one Orthogonal Frequency Division Multiplexing (OFDM) symbol in a time axis and 8 subcarriers in a frequency axis within a second slot of the backhaul subframe if an extended cyclic prefix (CP) is applied to the backhaul subframe.

4. The method according to claim 3, wherein an index of the one OFDM symbol is 10.

5. The method according to claim 4, wherein the 8 subcarriers for DM RS transmission in the frequency axis have subcarrier indexes of 0, 1, 3, 4, 6, 7, 9 and 10 or other subcarrier indexes of 1, 2, 4, 5, 7, 8, 10 and 11.

6. A method for receiving a demodulation reference signal (DM RS) at a relay node (RN) in a wireless communication system, the method comprising:
    receiving the DM RS for the RN from a base station (BS) through a specific backhaul subframe,
    wherein the DM RS is mapped on resource elements (REs) of the specific backhaul subframe, the REs excluding orthogonal frequency division multiplexing (OFDM) symbols corresponding to a physical downlink control channel (PDCCH) and a guard time, the guard time for a mode transition of the RN between a reception mode and a transmission mode,
    wherein subcarrier frequency indexes of the REs are 2, 5, 8 and 11 in a frequency axis within a second slot of the specific backhaul subframe if an extended cyclic prefix (CP) is applied to the specific backhaul subframe.

7. The method according to claim 6, wherein OFDM symbol indexes of the REs are 7 and 8 or 8 and 10 in the time axis if the extended cyclic prefix (CP) is applied to the specific backhaul subframe.

8. A method for receiving a demodulation reference signal (DM RS) at a relay node (RN) in a wireless communication system, the method comprising:
receiving the DM RS for the RN from a base station (BS) through a specific backhaul subframe,
wherein the DM RS is mapped on resource elements (REs) of the specific backhaul subframe for a mode transition of the RN between a reception mode and a transmission mode, the REs excluding orthogonal frequency division multiplexing (OFDM) symbols corresponding to a physical downlink control channel (PDCCH) and a guard time, the guard time for a mode transition of the relay node (RN)RN between a reception mode and a transmission mode,
wherein the REs are located in one Orthogonal Frequency Division Multiplexing (OFDM) symbol in a time axis and 8 subcarriers in a frequency axis within a second slot of the specific backhaul subframe if an extended cyclic prefix (CP) is applied to the backhaul subframe.

9. The method according to claim 8, wherein an index of the one OFDM symbol is 10.

10. The method according to claim 9, wherein the 8 subcarriers for DM RS reception in the frequency axis have subcarrier indexes of 0, 1, 3, 4, 6, 7, 9 and 10 or other subcarrier indexes of 1, 2, 4, 5, 7, 8, 10 and 11.

11. A base station (BS) apparatus for transmitting a demodulation reference signal (DM RS) in a wireless communication system, the BS apparatus comprising:
a processor for determining whether a downlink subframe is a normal subframe or a backhaul subframe and mapping the DM RS on resource elements (REs) of the backhaul subframe if the downlink subframe is the backhaul subframe, the REs excluding orthogonal frequency division multiplexing (OFDM) symbols corresponding to a physical downlink control channel (PDCCH) and a guard time, the guard time for a mode transition of a relay node (RN) between a reception mode and a transmission mode; and
a transmitter for transmitting the DM RS to the RN through the backhaul subframe
wherein subcarrier frequency indexes of the REs are 2, 5, 8 and 11 in a frequency axis within a second slot of the backhaul subframe if an extended cyclic prefix (CP) is applied to the backhaul subframe.

12. The BS apparatus according to claim 11, wherein OFDM symbol indexes of the REs are 7 and 8 or 8 and 10 in the time axis if an extended cyclic prefix (CP) is applied to the backhaul subframe.

13. A base station (BS) apparatus for transmitting a demodulation reference signal (DM RS) in a wireless communication system, the BS apparatus comprising:
a processor for determining whether a downlink subframe is a normal subframe or a backhaul subframe and mapping the DM RS on resource elements (REs) of the backhaul subframe if the downlink subframe is the backhaul subframe, the REs excluding orthogonal frequency division multiplexing (OFDM) symbols corresponding to a physical downlink control channel (PDCCH) and a guard time, the guard time for a mode transition of a relay node (RN) between a reception mode and a transmission mode; and
a transmitter for transmitting the DM RS to the RN through the backhaul subframe,
wherein the REs are located in one Orthogonal Frequency Division Multiplexing (OFDM) symbol in a time axis and 8 subcarriers in a frequency axis within the second slot of the backhaul subframe if an extended cyclic prefix (CP) is applied to the backhaul subframe.

14. The BS apparatus according to claim 13, wherein an index of the single OFDM symbol is 10.

15. The BS apparatus according to claim 14, wherein the 8 subcarriers for DM RS transmission in the frequency axis have subcarrier indexes of 0, 1, 3, 4, 6, 7, 9 and 10 or other subcarrier indexes of 1, 2, 4, 5, 7, 8, 10 and 11.

16. A relay node (RN) apparatus for receiving a demodulation reference signal (DM RS) from a base station (BS) in a wireless communication system, the RN apparatus comprising:
a receiver for receiving the DM RS for the RN from the BS through a specific backhaul subframe,
wherein the DM RS is mapped on resource elements (REs) of the specific backhaul subframe , the REs excluding orthogonal frequency division multiplexing (OFDM) symbols corresponding to a physical downlink control channel (PDCCH) and a guard time, the guard time for a mode transition of the RN between a reception mode and a transmission mode,
wherein subcarrier frequency indexes of the REs are 2, 5, 8 and 11 in a frequency axis within a second slot of the specific backhaul subframe if an extended cyclic prefix (CP) is applied to the specific backhaul subframe.

17. The RN apparatus according to claim 16, wherein OFDM symbol indexes of the REs are 7 and 8 or 8 and 10 in the time axis if the extended cyclic prefix (CP) is applied to the specific backhaul subframe.

18. A relay node (RN) apparatus for receiving a demodulation reference signal (DM RS) from a base station (BS) in a wireless communication system, the RN apparatus comprising:
a receiver for receiving the DM RS for an RN from the BS through a specific backhaul subframe,
wherein the DM RS is mapped on resource elements (REs) of the specific backhaul subframe, the REs excluding orthogonal frequency division multiplexing (OFDM) symbols corresponding to a physical downlink control channel (PDCCH) and a guard time, the guard time for a mode transition of the RN between a reception mode and a transmission mode,
wherein the REs are located in one Orthogonal Frequency Division Multiplexing (OFDM) symbol in a time axis 8 subcarriers in a frequency axis within a second slot of the specific backhaul subframe if an extended cyclic prefix (CP) is applied to the backhaul subframe.

19. The RN apparatus according to claim 18, wherein an index of the single OFDM symbol is 10.

20. The RN apparatus according to claim 19, wherein the 8 subcarriers for DM RS reception in the frequency axis have subcarrier indexes of 0, 1, 3, 4, 6, 7, 9 and 10 or other subcarrier indexes of 1, 2, 4, 5, 7, 8, 10 and 11.

* * * * *